(12) United States Patent
Dinh et al.

(10) Patent No.: US 11,863,756 B2
(45) Date of Patent: Jan. 2, 2024

(54) IMAGE ENCODING AND DECODING APPARATUS AND METHOD USING ARTIFICIAL INTELLIGENCE

(71) Applicant: SAMSUNG ELECTRONICS CO., LTD., Suwon-si (KR)

(72) Inventors: Quockhanh Dinh, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/677,414

(22) Filed: Feb. 22, 2022

(65) Prior Publication Data

US 2022/0272352 A1 Aug. 25, 2022

Related U.S. Application Data

(63) Continuation of application No. PCT/KR2022/002486, filed on Feb. 21, 2022.

(30) Foreign Application Priority Data

Feb. 22, 2021 (KR) .................. 10-2021-0023695
Sep. 15, 2021 (KR) .................. 10-2021-0123369
Nov. 15, 2021 (KR) .................. 10-2021-0157089

(51) Int. Cl.
*H04N 19/137* (2014.01)
*H04N 19/43* (2014.01)
(Continued)

(52) U.S. Cl.
CPC ......... *H04N 19/137* (2014.11); *H04N 19/124* (2014.11); *H04N 19/43* (2014.11); *H04N 19/51* (2014.11); *H04N 19/91* (2014.11)

(58) Field of Classification Search
CPC .... H04N 19/124; H04N 19/137; H04N 19/43; H04N 19/51; H04N 19/513; H04N 19/537; H04N 19/91
See application file for complete search history.

(56) References Cited

U.S. PATENT DOCUMENTS 10,825,140 B1   11/2020   Yang et al.
10,911,775 B1   2/2021    Zhu et al.
(Continued)

FOREIGN PATENT DOCUMENTS

KR   10-2018-0052651 A   5/2018
KR   10-2020-0016879 A   2/2020
KR   10-2020-0140096 A   12/2020

OTHER PUBLICATIONS

E. Agustsson, D. Minnen, N. Johnston, J. Ballé, S. J. Hwang and G. Toderici, "Scale-Space Flow for End-to-End Optimized Video Compression," 2020 IEEE/CVF Conference on Computer Vision and Pattern Recognition (CVPR), Seattle, WA, USA, Jun. 13-19, 2020 (hereinafter Agustsson).*

(Continued)

*Primary Examiner* — Mohammed S Rahaman
(74) *Attorney, Agent, or Firm* — Sughrue Mion, PLLC

(57) ABSTRACT

An image decoding method using artificial intelligence (AI), including obtaining feature data of a current optical flow and feature data of current differential data from a bitstream corresponding to a current image; obtaining the current optical flow by applying the feature data of the current optical flow to a neural-network-based first decoder; applying at least one of the feature data of the current optical flow and feature data of a previous optical flow to a first preprocessing neural network; obtain a first concatenation result by concatenating feature data obtained from the first preprocessing neural network with the feature data of the current differential data; obtaining the current differential data by (Continued)

applying the first concatenation result to a neural-network-based second decoder; and reconstructing the current image using the current differential data and a current predicted image generated from a previous reconstructed image based on the current optical flow.

9 Claims, 19 Drawing Sheets

(51) Int. Cl.
*H04N 19/51* (2014.01)
*H04N 19/124* (2014.01)
*H04N 19/91* (2014.01)

(56) References Cited

U.S. PATENT DOCUMENTS

| | | | |
|---|---|---|---|
| 11,019,355 B2 | 5/2021 | Cho et al. | |
| 11,196,992 B2 | 12/2021 | Huang et al. | |
| 11,501,532 B2 | 11/2022 | Gan et al. | |
| 11,532,090 B2 | 12/2022 | Chen et al. | |
| 11,610,082 B2 | 3/2023 | Huang et al. | |
| 2019/0246102 A1 | 8/2019 | Cho et al. | |
| 2019/0246138 A1 | 8/2019 | Terterov et al. | |
| 2019/0297326 A1 | 9/2019 | Reda et al. | |
| 2020/0053388 A1 | 2/2020 | Schroers et al. | |
| 2020/0236349 A1 | 7/2020 | Zhai et al. | |
| 2020/0272903 A1* | 8/2020 | Rippel | G06V 20/46 |
| 2020/0273185 A1* | 8/2020 | Chen | G06T 7/33 |
| 2020/0304798 A1 | 9/2020 | Zhao et al. | |

OTHER PUBLICATIONS

J. Lin, D. Liu, H. Li and F. Wu, "M-LVC: Multiple Frames Prediction for Learned Video Compression," in 2020 IEEE/CVF Conference on Computer Vision and Pattern Recognition (CVPR), Seattle, WA, USA, Jun. 13-19, 2020.*

Eirikur Agustsson et al., "Scale-space flow for end-to-end optimized video compression", Computer Vision Foundation, Jun. 2020, 10 pages total.

Guo Lu et al., "DVC: An End-to-end Deep Video Compression Framework", Computer Vision Foundation, Jun. 2019, 10 pages total.

Search Report (PCT/ISA/220, PCT/ISA/210) dated May 30, 2022 by the International Searching Authority for International Application No. PCT/KR2022/002486.

Written Opinion (PCT/ISA/237) dated May 30, 2022 by the International Searching Authority for International Application No. PCT/KR2022/002486.

Search Report (PCT/ISA/220, PCT/ISA/210) dated May 26, 2022 by the International Searching Authority for International Application No. PCT/KR2022/002493.

Written Opinion (PCT/ISA/237) dated May 26, 2022 by the International Searching Authority for International Application No. PCT/KR2022/002493.

Lin, et al., "M-LVC: Multiple Frames Prediction for Learned Video Compression", 2020, arXiv:2004.10 290v1, 15 pages total.

* cited by examiner

IMAGE ENCODING AND DECODING APPARATUS AND METHOD USING ARTIFICIAL INTELLIGENCE

CROSS-REFERENCE TO RELATED APPLICATIONS

This application is a bypass continuation application of International Application No. PCT/KR2022/002486, filed on Feb. 21, 2022, which claims priority to Korean Patent Application No. 10-2021-0023695, filed on Feb. 22, 2021, and Korean Patent Application No. 10-2021-0123369, filed on Sep. 15, 2021, and Korean Patent Application No. 10-2021-0157089, filed on Nov. 15, 2021, in the Korean Intellectual Property Office, the disclosures of which are incorporated by reference herein in their entireties.

BACKGROUND

1. Field

The disclosure relates to image encoding and decoding. More particularly, the disclosure relates to image encoding and decoding technology using artificial intelligence (AI), e.g., a neural network.

2. Description of Related Art

Codecs such as H.264 Advanced Video Coding (AVC) and High Efficiency Video Coding (HEVC) may divide an image into blocks and predictively encode and decode each block through inter prediction or intra prediction.

Intra prediction is a method of compressing an image by removing spatial redundancy in the image, and inter prediction is a method of compressing an image by removing temporal redundancy between images.

A representative example of inter prediction is motion estimation coding. Motion estimation coding predicts blocks of a current image by using a reference image. A reference block which is the most similar to a current block may be found in a certain search range by using a certain evaluation function. The current block is predicted based on the reference block, and a differential block is generated and encoded by subtracting, from the current block, the predicted block generated as the prediction result.

To calculate a motion vector indicating the reference block in the reference image, a motion vector of previously encoded blocks may be used as a prediction motion vector of the current block. A differential motion vector corresponding to a difference between the motion vector and the prediction motion vector of the current block is signaled to a decoder in a certain manner.

SUMMARY

Provided are image encoding and decoding apparatuses and methods capable of more accurately reconstructing an optical flow and differential data of an image.

Also provided are image encoding and decoding apparatuses and methods capable of reducing the size of a bitstream obtained as a result of encoding an image, and improving the performance of reconstructing the image.

In accordance with an aspect of the disclosure, an image decoding method using artificial intelligence (AI) includes obtaining feature data of a current optical flow and feature data of current differential data from a bitstream corresponding to a current image; obtaining the current optical flow by applying the feature data of the current optical flow to a neural-network-based first decoder; applying at least one of the feature data of the current optical flow and feature data of a previous optical flow to a first preprocessing neural network; obtain a first concatenation result by concatenating feature data obtained from the first preprocessing neural network with the feature data of the current differential data; obtaining the current differential data by applying the first concatenation result to a neural-network-based second decoder; and reconstructing the current image using the current differential data and a current predicted image generated from a previous reconstructed image based on the current optical flow.

The image encoding and decoding apparatuses and methods according to an embodiment of the disclosure may more accurately reconstruct optical flow and differential data of an image.

In addition, the image encoding and decoding apparatuses and methods according to an embodiment of the disclosure may reduce the size of a bitstream obtained as a result of encoding an image, and improve the performance of reconstructing the image.

DETAILED DESCRIPTION

Figure 1:
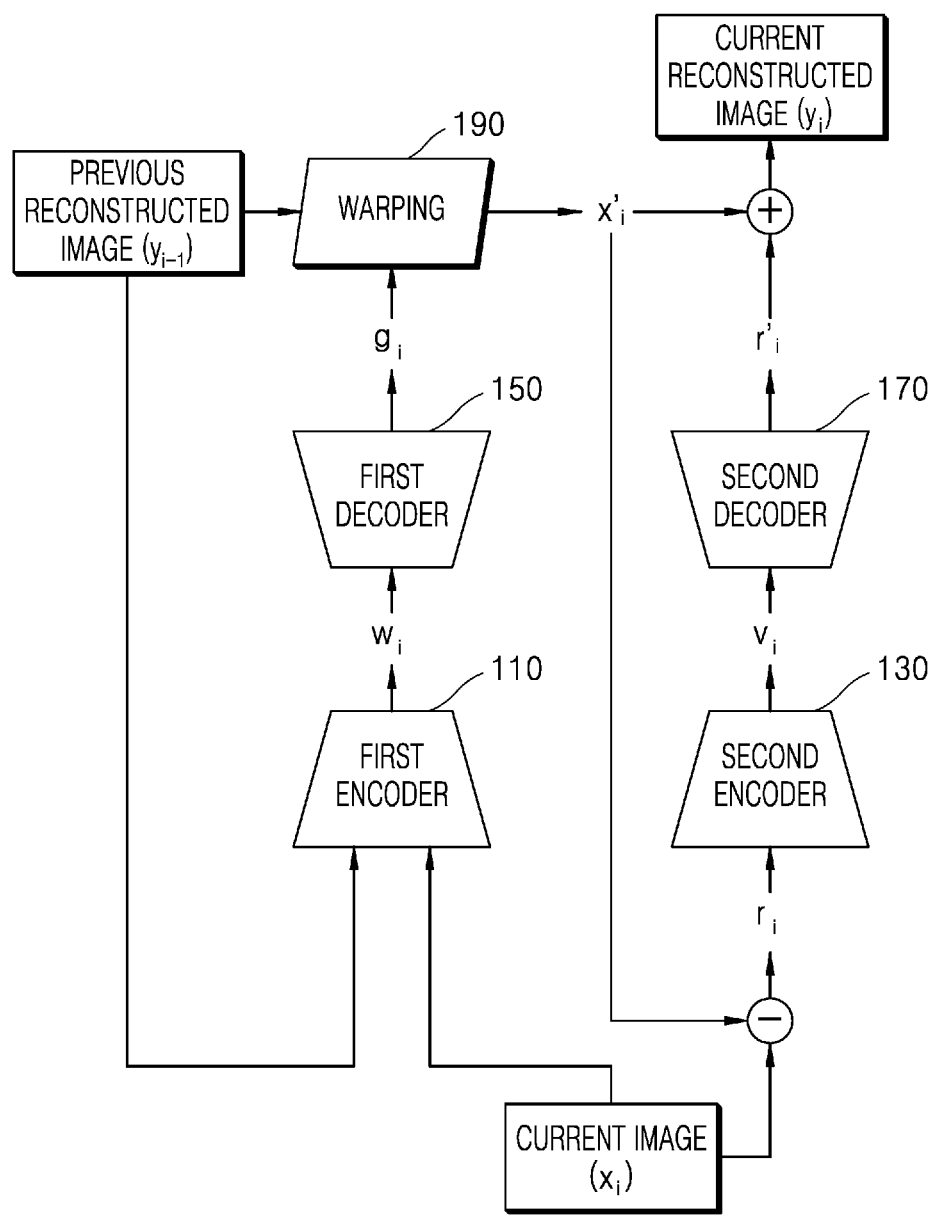
FIG. 1 is a diagram showing a predictive image encoding and decoding procedure based on artificial intelligence (AI), according to an embodiment.

In accordance with an aspect of the disclosure, an image decoding method using artificial intelligence (AI) includes obtaining feature data of a current optical flow and feature data of current differential data from a bitstream corresponding to a current image; obtaining the current optical flow by applying the feature data of the current optical flow to a neural-network-based first decoder; applying at least one of the feature data of the current optical flow and feature data of a previous optical flow to a first preprocessing neural network; obtain a first concatenation result by concatenating feature data obtained from the first preprocessing neural network with the feature data of the current differential data; obtaining the current differential data by applying the first concatenation result to a neural-network-based second decoder; and reconstructing the current image using the current differential data and a current predicted image generated from a previous reconstructed image based on the current optical flow.

The obtaining of the current optical flow may include applying the feature data of the previous optical flow to a second preprocessing neural network; obtaining a second concatenation result by concatenating the feature data of the current optical flow and feature data obtained from the second preprocessing neural network; and obtaining the current optical flow by applying the second concatenation result to the neural-network-based first decoder.

The obtaining of the current optical flow may include applying feature data of previous differential data to a third preprocessing neural network; obtaining a third concatenation result by concatenating the feature data of the current optical flow and feature data obtained from the third preprocessing neural network; and obtaining the current optical flow by applying the third concatenation result to the neural-network-based first decoder.

The obtaining of the current differential data may include applying feature data of previous differential data to a fourth preprocessing neural network; obtaining a fourth concatenation result by concatenating the feature data of the current differential data, the feature data obtained from the first preprocessing neural network, and the feature data obtained from the fourth preprocessing neural network; and obtaining the current differential data by applying the fourth concatenation result of to the neural-network-based second decoder.

The reconstructing of the current image may include generating the current predicted image by warping the previous reconstructed image based on the current optical flow.

The feature data of the current optical flow and the feature data of the current differential data may be obtained by performing entropy-decoding and inverse-quantization on the bitstream.

At least one of the neural-network-based first decoder, the neural-network-based second decoder, and the first preprocessing neural network may be trained based on first loss information corresponding to a difference between a current training image and a current reconstructed training image corresponding to the current training image, second loss information corresponding to entropy of feature data of an optical flow of the current training image, and third loss information corresponding to entropy of feature data of differential data of the current training image.

In accordance with an aspect of the disclosure, a non-transitory computer-readable medium configured to store instructions which, when executed by at least one processor of an image decoding apparatus using artificial intelligence (AI), cause the at least one processor to: obtain feature data of a current optical flow and feature data of current differential data from a bitstream corresponding to a current image; obtain the current optical flow by applying the feature data of the current optical flow to a neural-network-based first decoder; apply at least one of the feature data of the current optical flow and feature data of a previous optical flow to a first preprocessing neural network; obtain a first concatenation result by concatenating feature data obtained from the first preprocessing neural network with the feature data of the current differential data; obtain the current differential data by applying the first concatenation result to a neural-network-based second decoder; and reconstruct the current image using the current differential data and a current predicted image generated from a previous reconstructed image based on the current optical flow.

In accordance with an aspect of the disclosure, an image decoding apparatus using artificial intelligence (AI) includes at least one processor configured to implement: a bitstream obtainer obtainer configured to obtain a bitstream for a current image; and a predictive decoder configured to: obtain feature data of a current optical flow and feature data of current differential data from the bitstream, obtain the current optical flow by applying the feature data of the current optical flow to a neural-network-based first decoder, apply at least one of the feature data of the current optical flow and feature data of a previous optical flow to a first preprocessing neural network, obtain a concatenation result by concatenating feature data obtained from the first preprocessing neural network with the feature data of the current differential data, obtain the current differential data by applying the concatenation result to a neural-network-based second decoder, and reconstruct the current image using the current differential data and a current predicted image generated from a previous reconstructed image based on the current optical flow.

In accordance with an aspect of the disclosure, an image encoding method using artificial intelligence (AI) includes obtaining feature data of a current optical flow by applying a current image and a previous reconstructed image to a neural-network-based first encoder; obtaining the current optical flow by applying the feature data of the current optical flow to a neural-network-based first decoder; generating a current predicted image based on the previous reconstructed image and the current optical flow; obtaining current differential data between the current image and the current predicted image; obtaining feature data of the current differential data by applying the current differential data to a neural-network-based second encoder; and generating a bitstream based on the feature data of the current optical flow and the feature data of the current differential data.

In accordance with an aspect of the disclosure, an image decoding method using artificial intelligence (AI) includes obtaining feature data of a current optical flow and feature data of current differential data from a bitstream corresponding to a current image; performing at least one of a first neural network preprocessing operation, a second neural network preprocessing operation, a third neural network preprocessing operation, and a fourth neural network preprocessing operation; obtaining a first concatenation result by concatenating the feature data of the current optical flow with at least one of a result of the second neural network preprocessing operation and a result of the third neural network preprocessing operation; obtaining the current optical flow by applying the first concatenation result to a neural-network-based first decoder; obtaining a second concatenation result by concatenating the feature data of the current differential data with at least one of a result of the first neural network preprocessing operation and a result of the fourth neural network preprocessing operation; obtaining the current differential data by applying the second concatenation result to a neural-network-based second decoder; and reconstructing the current image by warping a previous reconstructed image based on the current optical flow, and applying the current differential data to the warped previous reconstructed image, wherein the first neural network preprocessing operation comprises applying at least one of the feature data of the current optical flow and feature data of a previous optical flow to a first preprocessing neural network, wherein the second neural network preprocessing operation comprises applying the feature data of the previous optical flow to a second preprocessing neural network, wherein the third neural network preprocessing operation comprises applying feature data of previous differential data to a third preprocessing neural network, and wherein the fourth neural network preprocessing operation comprises applying the feature data of the previous differential data to a fourth preprocessing neural network.

While embodiments of the disclosure are susceptible to various modifications and alternative forms, specific embodiments thereof are shown by way of example in the drawings and will herein be described in detail. It should be understood, however, that there is no intent to limit embodiments of the disclosure to the particular forms disclosed, but conversely, embodiments of the disclosure are to cover all modifications, equivalents, and alternatives falling within the scope of the disclosure.

Below, a detailed description of known functions and configurations incorporated herein will be omitted when it may make the subject matter of the disclosure unclear. It will be understood that the terms "first", "second", etc. used herein are only to distinguish one element from another.

Throughout the disclosure, the expression "at least one of a, b or c" indicates only a, only b, only c, both a and b, both a and c, both b and c, all of a, b, and c, or variations thereof.

It will be also understood, in the disclosure, that when an element is referred to as being "connected" or "coupled" to another element, it may be directly connected or coupled to the other element or be connected or coupled to the other element through an intervening element, unless the context clearly indicates otherwise.

As is traditional in the field, embodiments may be described and illustrated in terms of blocks which carry out a described function or functions. These blocks, as shown in the drawings, which may be referred to herein as "units" or "modules" or the like, or by names such as encoder, decoder, obtainer, quantizer, transformer, subtractor, or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

In the disclosure, two or more elements expressed as "units", "modules", or the like may be combined into one element, or one element may be divided into two or more elements for subdivided functions. Each element described herein may not only perform main functions thereof but also additionally perform some or all functions of other elements, and some main functions of each element may be exclusively performed by another element.

As used herein, the term "image" may refer to a still image, a moving image including a plurality of consecutive still images or frames, or a video.

A "neural network" may be a representative example of an artificial neural network model that mimics brain nerves, and embodiments are not limited to an artificial neural network model using a specific algorithm. The neural network may also be referred to as a deep neural network.

In the disclosure, "parameters" may be values used for calculation by each layer included in the neural network, and may be used, for example, to apply input values to a certain operation formula. The parameters may be values set as a result of training, and may be updated based on separate training data when necessary.

"Feature data" may refer to data obtained by processing input data by a neural-network-based encoder. The feature data may be 1-dimensional or 2-dimensional data including a plurality of samples. The feature data may also be referred to as latent representation. The feature data may represent latent features of data output by a decoder described below.

A "current image" may refer to an image to be currently processed, a "current optical flow" refers to an optical flow obtained for the current image, and "current differential data" refers to differential data obtained for the current image.

A "previous image" may refer to an image to be processed before the current image, a "previous optical flow" refers to an optical flow obtained for the previous image, and "previous differential data" refers to differential data obtained for the previous image.

"Samples" may correspond to data assigned to sampling positions in an image, a feature map, or feature data, and refer to data to be processed. For example, the samples may be pixel values in a frame of the spatial domain.

FIG. 1 is a diagram showing a predictive image encoding and decoding procedure based on artificial intelligence (AI).

FIG. 1 shows a procedure of encoding and decoding a current image $x_i$ based on inter prediction, and a first encoder 110, a second encoder 130, a first decoder 150, and a second decoder 170 are used for inter prediction. The first encoder 110, the second encoder 130, the first decoder 150, and the second decoder 170 are implemented as neural networks.

Inter prediction is a procedure of encoding/decoding the current image $x_i$ by using temporal redundancy between the current image $x_i$ and a previous reconstructed image $y_{i-1}$, and position differences (or motion vectors) between blocks or samples in the current image $x_i$ and reference blocks or reference samples in the previous reconstructed image $y_{i-1}$ are used to encode and decode the current image $x_i$. These position differences may be referred to as an optical flow. The optical flow may be defined as a set of motion vectors corresponding to samples or blocks in an image.

The optical flow represents how positions of samples in the previous reconstructed image $y_{i-1}$ are changed in the current image $x_i$, or where samples of the current image $x_i$ are positioned in the previous reconstructed image $y_{i-1}$. For example, when a sample positioned at (1, 1) in the previous reconstructed image $y_{i-1}$ is positioned at (2, 1) in the current image $x_i$, an optical flow or motion vector of the sample may be calculated as (1(=2−1), 0(=1−1)).

In the image encoding and decoding procedure using AI, the first encoder 110 and the first decoder 150 are used to obtain a current optical flow $g_i$ of the current image $x_i$.

Specifically, the previous reconstructed image $y_{i-1}$ and the current image $x_i$ are input to the first encoder 110. The first encoder 110 outputs feature data $w_i$ of the current optical flow by processing the current image $x_i$ and the previous reconstructed image $y_{i-1}$ based on parameters set as a result of training.

The feature data $w_i$ of the current optical flow is input to the first decoder 150. The first decoder 150 outputs the current optical flow $g_i$ by processing the input feature data $w_i$ based on parameters set as a result of training.

The previous reconstructed image $y_{i-1}$ is warped, for example by the warping 190, based on the current optical flow $g_i$, and a current predicted image $x'_i$ is obtained as the result of the warping 190.

The warping 190 is a type of geometric transformation for changing positions of samples in an image. The current predicted image $x'_i$ similar to the current image $x_i$ may be obtained by warping the previous reconstructed image $y_{i-1}$, for example by the warping 190, based on the optical flow $g_i$ representing relative positions between samples in the previous reconstructed image $y_{i-1}$ and samples in the current image $x_i$. For example, when a sample positioned at (1, 1) in the previous reconstructed image $y_{i-1}$ is the most similar to a sample positioned at (2, 1) in the current image $x_i$, the position of the sample positioned at (1, 1) in the previous reconstructed image $y_{i-1}$ may be changed to (2, 1) through the warping 190.

Because the current predicted image $x'_i$ generated using the previous reconstructed image $y_{i-1}$ is not the current image $x_i$ itself, current differential data $r_i$ between the current predicted image $x'_i$ and the current image $x_i$ may be obtained. For example, current differential data $r_i$ may be obtained by subtracting sample values in the current predicted image $x'_i$ from sample values in the current image $x_i$.

The current differential data $r_i$ is input to the second encoder 130. The second encoder 130 outputs feature data $v_i$ of the current differential data by processing the current differential data $r_i$ based on parameters set as a result of training.

The feature data $v_i$ of the current differential data is input to the second decoder 170. The second decoder 170 outputs current differential data $r'_i$ by processing the input feature data $v_i$ based on parameters set as a result of training.

A current reconstructed image $y_i$ is obtained by combining the current differential data $r'_i$ and the current predicted image $x'_i$ generated by warping the previous reconstructed image $y_{i-1}$, for example by the warping 190.

In the inter prediction procedure shown in FIG. 1, the first decoder 150 outputs the current optical flow $g_i$ by processing the feature data $w_i$ of the current optical flow, and the second decoder 170 outputs the current differential data $r'_i$ by processing the feature data $v_i$ of the current differential data.

That is, as illustrated in FIG. 1, only the feature data $w_i$ of the current optical flow is used for processing by the first decoder 150, and only the feature data $v_i$ of the current differential data is used for processing by the second decoder 170. However, data other than the feature data $w_i$ of the current optical flow and the feature data $v_i$ of the current differential data (e.g., a previous optical flow and previous differential data described below) may also directly or indirectly include information about the current image $x_i$, and thus the current optical flow $g_i$ and the current differential data $r'_i$ may be accurately reconstructed by inputting the other data including information about the current image $x_i$, to the first decoder 150 and the second decoder 170.

Examples of relationships between optical flows and differential data obtained between consecutive images will now be described with reference to FIG. 2.

Figure 2:
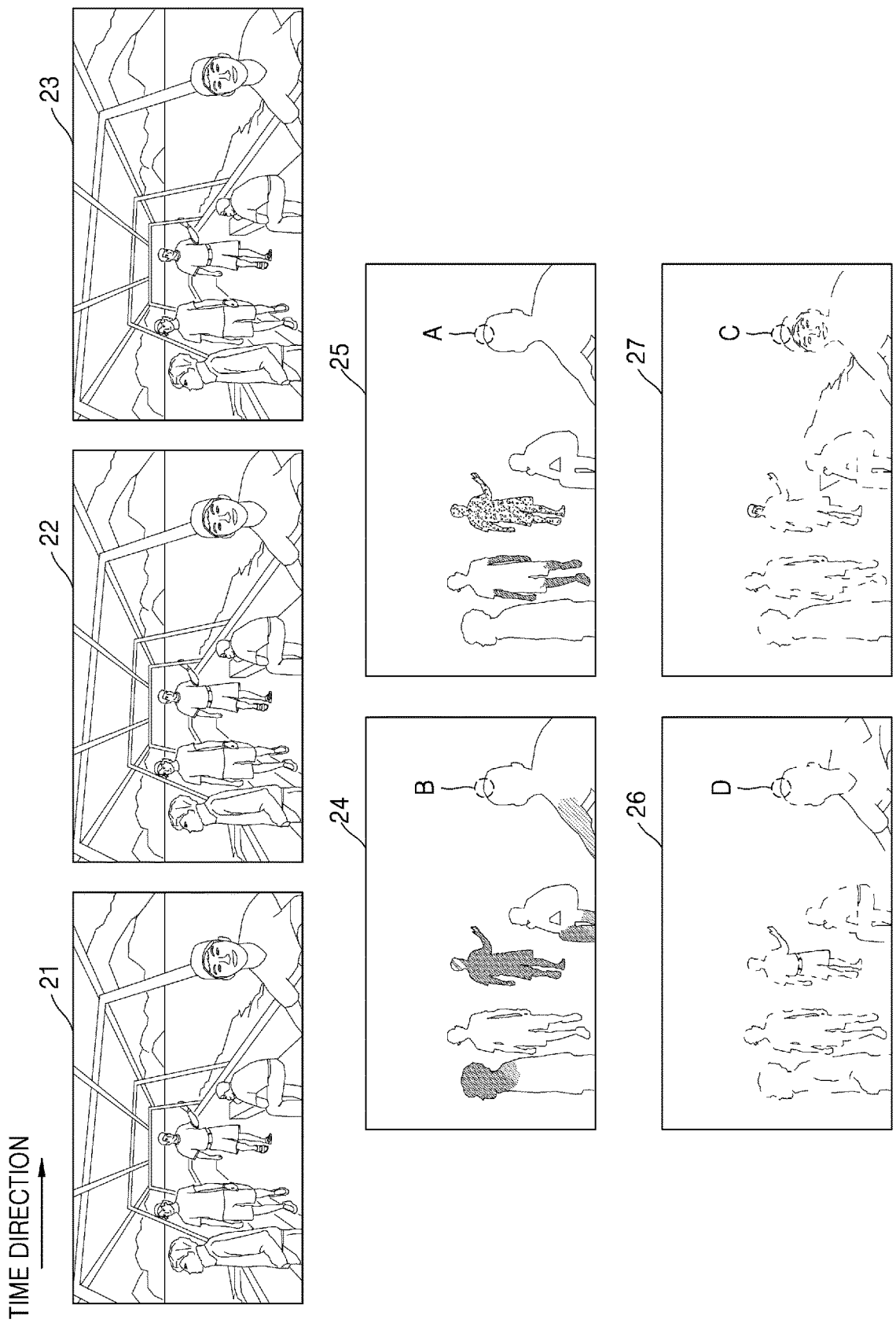
FIG. 2 is a diagram showing an example of consecutive images, optical flows between the consecutive images, and differential data between the consecutive images, according to an embodiment.

Referring to FIG. 2, a first optical flow 25 is obtained between a current image 23 and a first previous image 22, and a second optical flow 24 is obtained between the first previous image 22 and a second previous image 21.

The first optical flow 25 and the second optical flow 24 shown in FIG. 2 are visualized based on magnitudes of motion vectors and values of samples included in each optical flow. The first optical flow 25 may be referred to as a current optical flow, and the second optical flow 24 may be referred to as a previous optical flow.

First differential data 27 is obtained based on the current image 23 and the first previous image 22, and second differential data 26 is obtained based on the first previous image 22 and the second previous image 21.

For example, the first differential data 27 corresponding to a difference between the current image 23 and an image obtained by processing (e.g., warping) the first previous image 22 based on the first optical flow 25 may be obtained. In addition, the second differential data 26 corresponding to a difference between the first previous image 22 and an image obtained by processing (e.g., warping) the second previous image 21 based on the second optical flow 24 may be obtained.

The first differential data 27 may be referred to as current differential data, and the second differential data 26 may be referred to as previous differential data.

Referring to FIG. 2, similarity between the first optical flow 25, the second optical flow 24, the first differential data 27, and the second differential data 26 may be checked. For example, similarity in sample values of region A in the first optical flow 25, region B in the second optical flow 24, region C in the first differential data 27, and region D in the second differential data 26 may be checked.

Because the first optical flow 25 represents how much and in which directions positions of samples of the first previous image 22 are changed in the current image 23, there may be a high probability that a sample having a large value in the first optical flow 25 also has a large value in the first differential data 27. This is because the value of a sample at a certain position in the first differential data 27 corresponds to a difference between sample values at the same position in the current image 23 and the image generated as the result of processing the first previous image 22, and there may be a high probability that the samples at the same position have different values due to motion of an object in the first previous image 22.

In addition, because an object in temporally consecutive images tends to move linearly, similarity between the first optical flow 25 and the second optical flow 24 may be predicted and, likewise, similarity between the first differential data 27 and the second differential data 26 may be predicted.

That is, when the previous optical flow (for example the second optical flow 24) and the previous differential data (for example the second differential data 26) are used to reconstruct the current optical flow (for example the first optical flow 25) and the current differential data (for example the first differential data 27) of the current image 23, the current optical flow and the current differential data may be accurately reconstructed.

Figure 3:
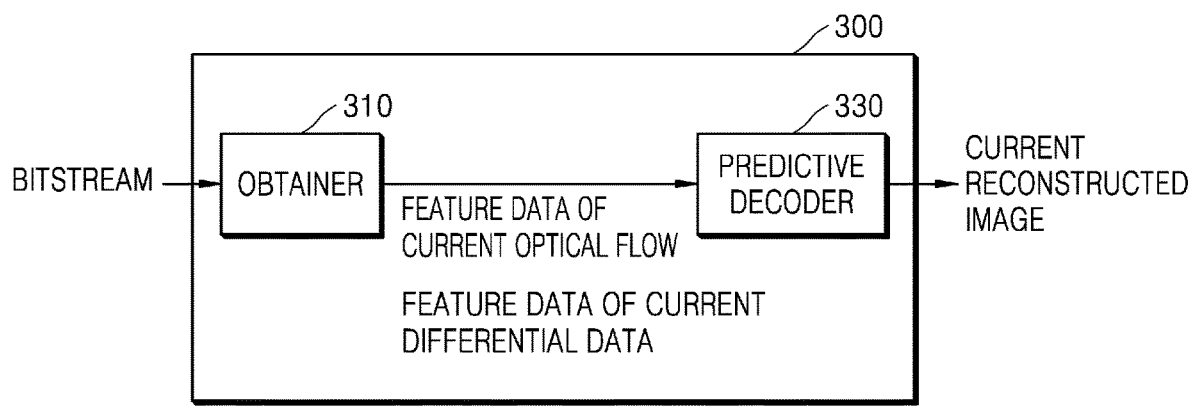
FIG. 3 is a block diagram of an image decoding apparatus according to an embodiment.

FIG. 3 is a block diagram of an image decoding apparatus 300 according to an embodiment of the disclosure.

Referring to FIG. 3, the image decoding apparatus 300 according to an embodiment of the disclosure includes an obtainer 310, which may be for example a bistream obtainer, and a predictive decoder 330.

The obtainer 310 and the predictive decoder 330 may be implemented as processors, and operate based on instructions stored in a memory.

Although the obtainer 310 and the predictive decoder 330 are individually illustrated in FIG. 3, in embodiments the obtainer 310 and the predictive decoder 330 may be implemented as one element, for example one processor. In this case, the obtainer 310 and the predictive decoder 330 may be implemented as a dedicated processor, or a combination of software and a general-purpose processor such as an application processor (AP), a central processing unit (CPU), or a graphics processing unit (GPU). The dedicated processor may include a memory to implement an embodiment of the disclosure, or include a memory processor to use an external memory.

In embodiments, the obtainer 310 and the predictive decoder 330 may be implemented as a plurality of processors. In this case, the obtainer 310 and the predictive decoder 330 may be implemented as a combination of dedicated processors, or a combination of software and general-purpose processors such as APs, CPUs, or GPUs.

The obtainer 310 obtains a bitstream including a result of encoding a current image.

The obtainer 310 may receive a bitstream transmitted through a network from an image encoding apparatus 1200 described below. In an embodiment of the disclosure, the obtainer 310 may obtain a bitstream from a data storage medium including a magnetic medium (e.g., a hard disk, a floppy disk, or magnetic tape), an optical medium (e.g., a compact disc read-only memory (CD-ROM) or a digital versatile disc (DVD)), or a magneto-optical medium (e.g., a floptical disk).

The obtainer 310 obtains feature data of a current optical flow and feature data of current differential data by parsing the bitstream.

The feature data of the current optical flow and the feature data of the current differential data may be obtained as a result of processing by the above-described neural-network-based encoder.

In an embodiment of the disclosure, the obtainer 310 may obtain a first bitstream corresponding to the feature data of the current optical flow and a second bitstream corresponding to the feature data of the current differential data, and obtain the feature data of the current optical flow and the feature data of the current differential data by parsing the first bitstream and the second bitstream, respectively.

The feature data of the current optical flow and the feature data of the current differential data are transmitted to the predictive decoder 330, and the predictive decoder 330 obtains a current reconstructed image corresponding to the current image, by using the feature data of the current optical flow and the feature data of the current differential data.

Examples of operations of the obtainer 310 and the predictive decoder 330 will now be described in detail with reference to FIGS. 4 and 5.

Figure 4:
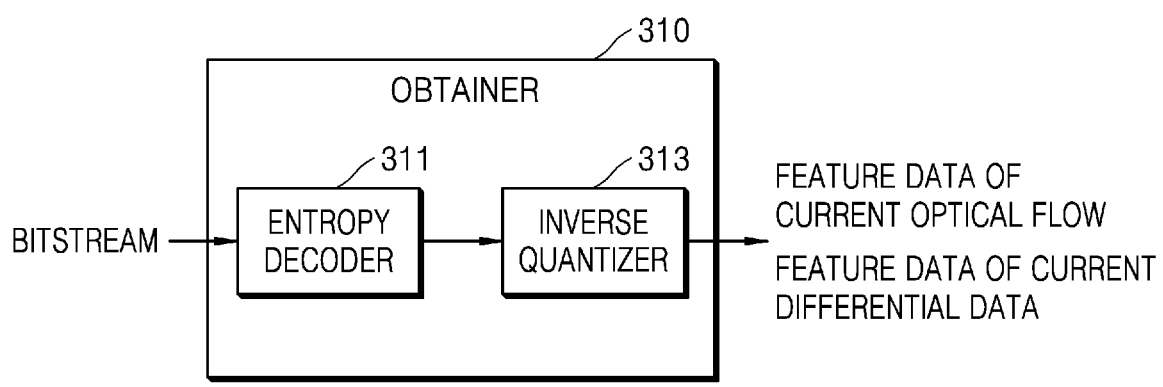
FIG. 4 is a block diagram of an obtainer illustrated in FIG. 3, according to an embodiment.

FIG. 4 is a block diagram of the obtainer 310 illustrated in FIG. 3.

Referring to FIG. 4, the obtainer 310 includes an entropy decoder 311 and an inverse quantizer 313.

The entropy decoder 311 obtains quantized feature data of a current optical flow and quantized feature data of current differential data by entropy-coding bins included in a bitstream.

The inverse quantizer 313 obtains feature data of the current optical flow and feature data of the current differential data by inversely quantizing the quantized feature data of the current optical flow and the quantized feature data of the current differential data.

Depending on implementation, in embodiments the obtainer 310 may further include an inverse transformer. The inverse transformer inversely transforms the feature data output from the inverse quantizer 313, from the frequency domain to the spatial domain. When the image encoding apparatus 1200 described below has transformed the feature data of the current optical flow and the feature data of the current differential data from the spatial domain to the frequency domain, the inverse transformer inversely transforms the feature data output from the inverse quantizer 313, from the frequency domain to the spatial domain.

Depending on implementation, in embodiments the obtainer 310 may not include the inverse quantizer 313. That is, the feature data of the current optical flow and the feature data of the current differential data may be obtained through processing by the entropy decoder 311.

Depending on implementation, in embodiments the obtainer 310 may obtain the feature data of the current optical flow and the feature data of the current differential data only by inversely binarizing the bins include in the bitstream. This may be performed for a case when the image encoding apparatus 1200 has generated the bitstream by binarizing the feature data of the current optical flow and the feature data of the current differential data, i.e., a case when the image encoding apparatus 1200 has not applied entropy-encoding, transformation, and quantization to the feature data of the current optical flow and the feature data of the current differential data.

Figure 5:
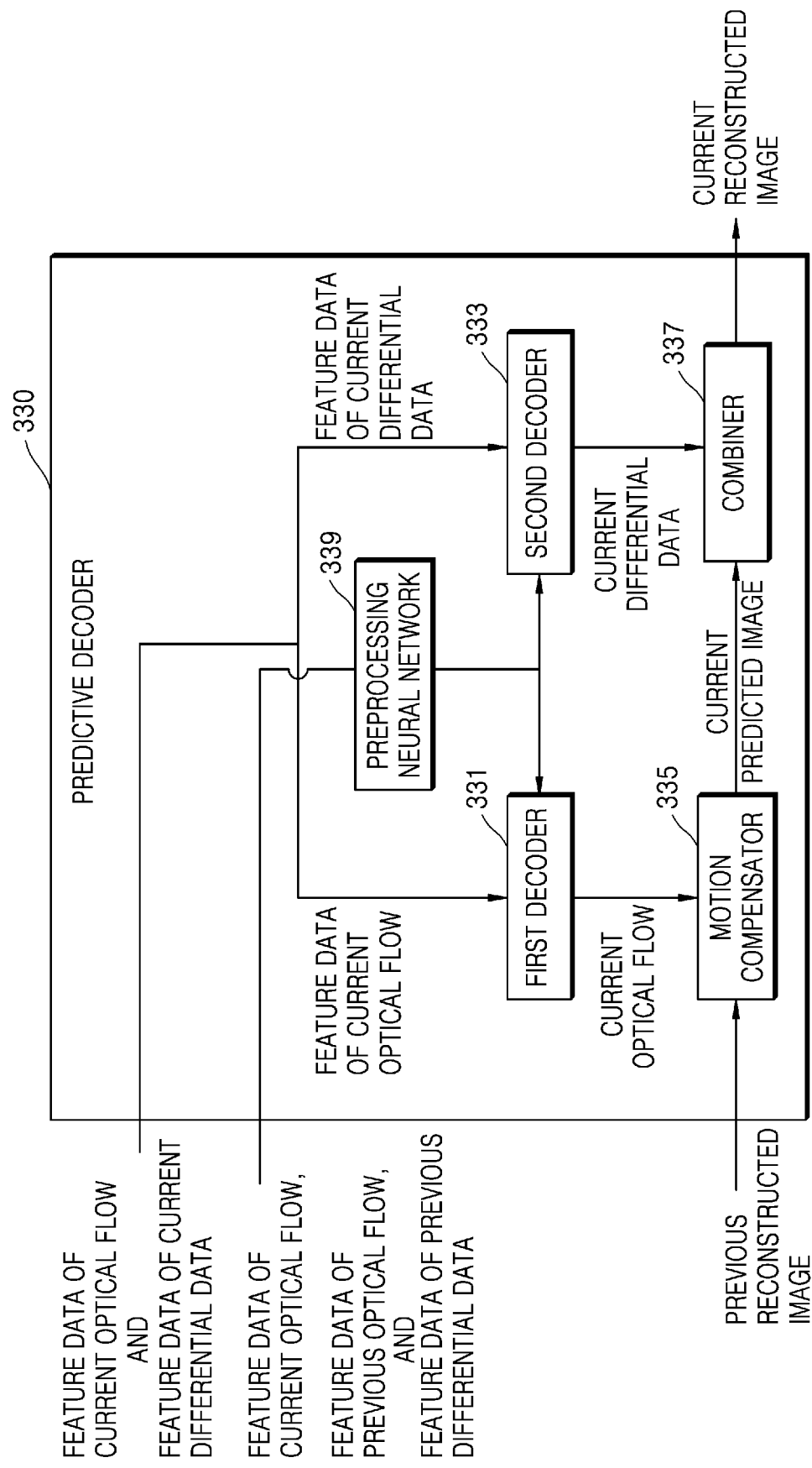
FIG. 5 is a block diagram of a predictive decoder illustrated in FIG. 3, according to an embodiment.

FIG. 5 is a block diagram of the predictive decoder 330 illustrated in FIG. 3.

Referring to FIG. 5, the predictive decoder 330 may include a preprocessing neural network 339, a first decoder 331, a second decoder 333, a motion compensator 335, and a combiner 337.

The preprocessing neural network 339, the first decoder 331, and the second decoder 333 may be stored in a memory. In an embodiment of the disclosure, the preprocessing neural network 339, the first decoder 331, and the second decoder 333 may be implemented as at least one dedicated processor for AI.

Although one preprocessing neural network 339 is illustrated in FIG. 5, as described below with reference to FIGS. 6 to 10, the predictive decoder 330 may use a plurality of preprocessing neural networks.

The feature data of the current optical flow output from the obtainer 310 is input to the first decoder 331, and the feature data of the current differential data output from the obtainer 310 is input to the second decoder 333. At least one of the feature data of the current optical flow, feature data of a previous optical flow, or feature data of previous differential data is processed by the preprocessing neural network 339, and then is input to the first decoder 331 or the second decoder 333.

As described above with reference to FIGS. 1 and 2, the current optical flow and the current differential data may be accurately reconstructed by inputting not only the feature data of the current optical flow and the feature data of the current differential data but also the data obtained through the preprocessing neural network 339, to the first decoder 331 and the second decoder 333.

For example, when the current optical flow is reconstructed using the feature data of the previous optical flow and the feature data of the current optical flow, which have similar features, the performance of reconstruction may be improved compared to a case using only the feature data of the current optical flow.

An example of a procedure of reconstructing the current optical flow and the current differential data by using the preprocessing neural network 339 will be described in detail below with reference to FIGS. 6 to 10.

The current optical flow obtained through the first decoder 331 is provided to the motion compensator 335, and the current differential data obtained through the second decoder 333 is provided to the combiner 337.

The motion compensator 335 generates a current predicted image similar to the current image, by processing a previous reconstructed image based on the current optical flow. The previous reconstructed image is an image reconstructed by decoding a previous image which was to be processed before the current image is processed.

The motion compensator 335 may warp the previous reconstructed image to generate the current predicted image. The warping for generating the current predicted image is an example, and the motion compensator 335 may apply various types of image processing to the previous reconstructed image to change positions of samples in the previous reconstructed image.

The current predicted image generated by the motion compensator 335 is provided to the combiner 337.

The combiner 337 obtains a current reconstructed image by combining the current predicted image and the current differential data. For example, the combiner 337 may obtain a current reconstructed image by summing sample values of the current predicted image and sample values of the current differential data. The current reconstructed image may be used to decode a next image.

An example of a procedure of reconstructing the current optical flow and the current differential data by using the preprocessing neural network 339, the first decoder 331, and the second decoder 333 will now be described in detail with reference to FIGS. 6 to 10.

Figure 6:
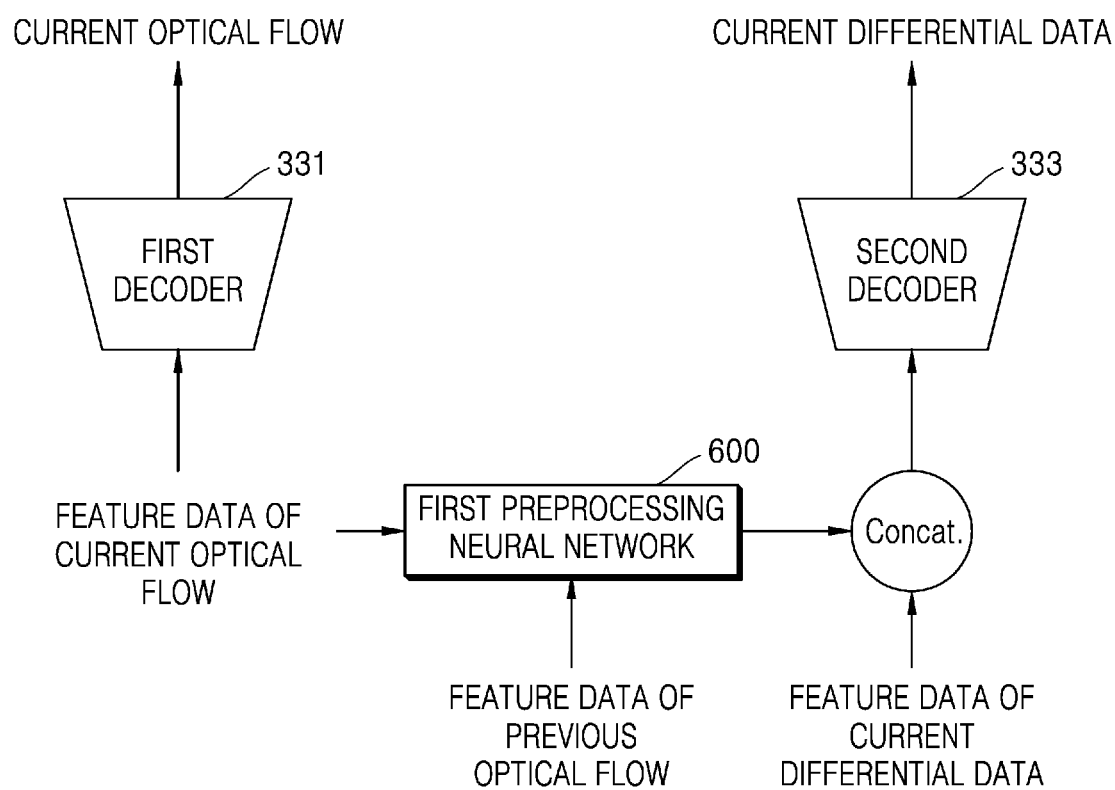
FIG. 6 is a diagram for describing a procedure of reconstructing current differential data by using a first preprocessing neural network, according to an embodiment.

FIG. 6 is a diagram for describing a procedure of reconstructing current differential data by using a first preprocessing neural network 600, according to an embodiment of the disclosure.

Referring to FIG. 6, feature data of a current optical flow is input to the first decoder 331, and the current optical flow is obtained as a result of processing by the first decoder 331.

Separately from the input of the feature data of the current optical flow to the first decoder 331, at least one of the feature data of the current optical flow or feature data of a previous optical flow is input to the first preprocessing neural network 600.

The first preprocessing neural network 600 processes the input feature data based on parameters set as a result of training. Feature data obtained through processing by the first preprocessing neural network 600 is concatenated with feature data of current differential data and then is input to the second decoder 333. Herein, the concatenation may refer to a process of combining two or more pieces of feature data in a channel direction.

The second decoder 333 outputs the current differential data by processing the input feature data.

In the embodiment of the disclosure shown in FIG. 6, at least one of the feature data of the current optical flow or the feature data of the previous optical flow is used to reconstruct the current differential data. That is, the performance of reconstructing the current differential data may be improved by using at least one of the feature data of the current optical flow or the feature data of the previous optical flow, which is correlated with the current differential data.

To specifically describe the correlation between the current differential data, and the current optical flow and the previous optical flow, initially, because the current differential data is obtained using a current image and a current predicted image, and the current optical flow is obtained using the current image and a previous reconstructed image, the correlation therebetween may be easily found in that they both include information about the current image.

Because the previous optical flow is obtained using a previous image and an image reconstructed before the previous image is processed, and the current differential data is obtained using the current image and the current predicted image which is generated using the previous reconstructed image corresponding to the previous image, both of the previous optical flow and the current differential data include information about the previous image.

In addition, as described above with reference to FIG. 2, similarity may be present between the previous optical flow and the current optical flow, and thus the correlation between the previous optical flow and the current differential data via the current optical flow may be found.

The first preprocessing neural network 600 may be used to change the domain of the feature data of the current optical flow and/or the feature data of the previous optical flow, and compensate for a mismatch between the current differential data and the feature data of the current optical flow and/or the feature data of the previous optical flow.

Specifically, the first preprocessing neural network 600 may change the feature data of the current optical flow and/or the feature data of the previous optical flow from the optical flow domain to the differential data domain. Because feature data of an optical flow represents latent features of the optical flow and feature data of differential data represents latent features of the differential data, the first preprocessing neural network 600 may change the domains thereof to be the same.

In addition, the first preprocessing neural network 600 may process the feature data of the current optical flow and/or the feature data of the previous optical flow in such a manner that the feature data obtained through the first preprocessing neural network 600 is more similar to the feature data of the current differential data. The mismatch between the current differential data and the feature data of the current optical flow and/or the feature data of the previous optical flow may include, for example, a difference in sample values or a difference in sample positions, and the first preprocessing neural network 600 may compensate for this mismatch.

Figure 7:
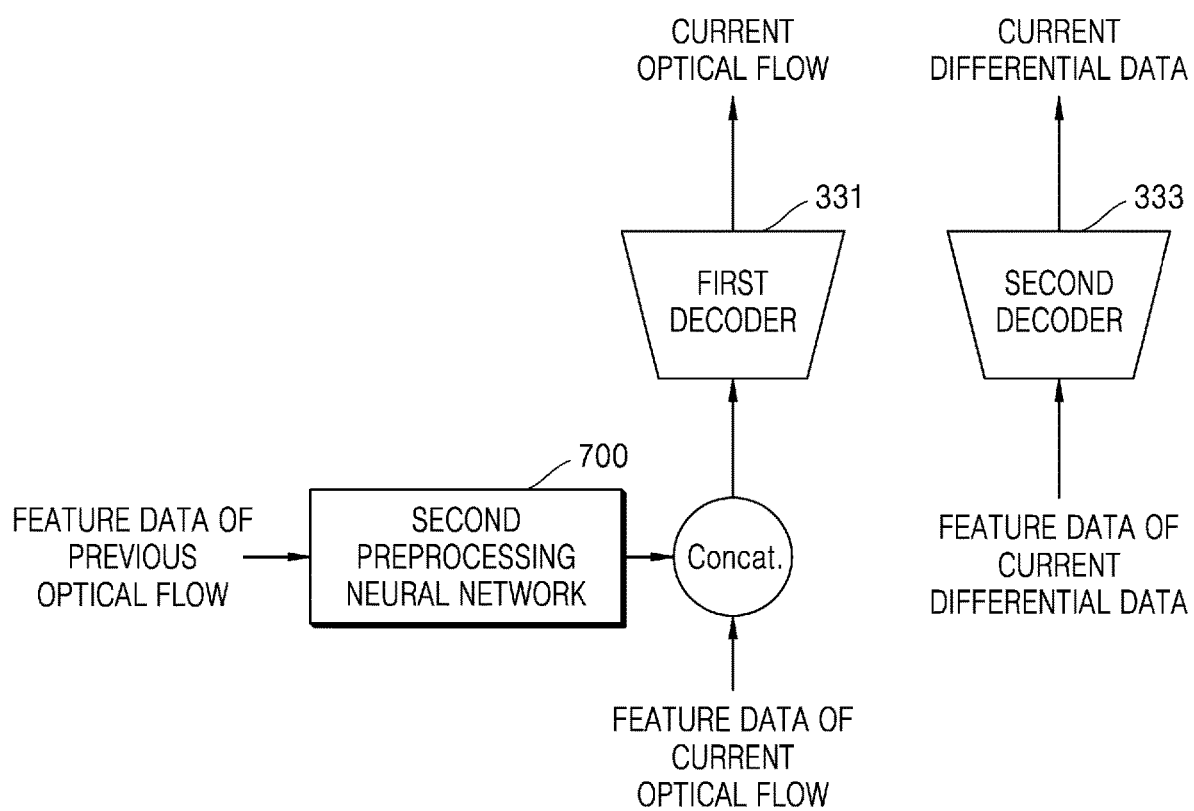
FIG. 7 is a diagram for describing a procedure of reconstructing a current optical flow by using a second preprocessing neural network, according to an embodiment.

FIG. 7 is a diagram for describing a procedure of reconstructing a current optical flow by using a second preprocessing neural network 700, according to an embodiment of the disclosure.

Referring to FIG. 7, feature data of current differential data is input to the second decoder 333, and the current differential data is obtained as a result of processing by the second decoder 333.

Feature data of a previous optical flow is input to the second preprocessing neural network 700, and feature data obtained through processing by the second preprocessing neural network 700 is concatenated with feature data of a current optical flow and then is input to the first decoder 331. The first decoder 331 outputs the current optical flow by processing the input feature data.

In the embodiment of the disclosure shown in FIG. 7, the feature data of the previous optical flow is used to reconstruct the current optical flow. That is, the performance of reconstructing the current optical flow may be improved by using the feature data of the previous optical flow which is correlated with the current optical flow.

As described above with reference to FIG. 2, an object in temporally consecutive images tends to move linearly, and thus the correlation between the current optical flow and the previous optical flow may be found.

The second preprocessing neural network 700 may be used to compensate for a mismatch between the feature data of the current optical flow and the feature data of the previous optical flow. Specifically, the second preprocessing neural network 700 may process the feature data of the previous optical flow in such a manner that the feature data obtained through the second preprocessing neural network 700 is more similar to the feature data of the current optical flow. The mismatch between the feature data of the current optical flow and the feature data of the previous optical flow may include, for example, a difference in sample values or a difference in sample positions, and the second preprocessing neural network 700 may compensate for this mismatch.

Figure 8:
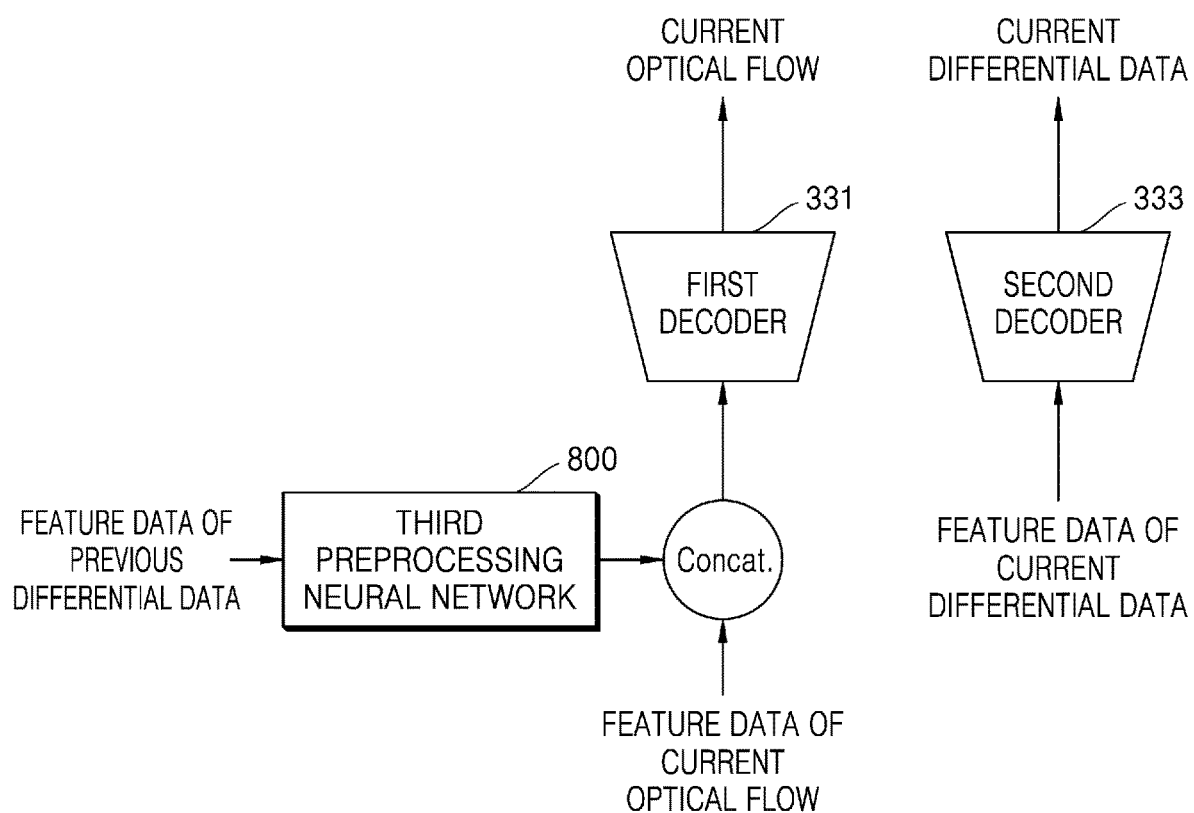
FIG. 8 is a diagram for describing a procedure of reconstructing a current optical flow by using a third preprocessing neural network, according to an embodiment.

FIG. 8 is a diagram for describing a procedure of reconstructing a current optical flow by using a third preprocessing neural network 800, according to an embodiment of the disclosure.

Referring to FIG. 8, feature data of current differential data is input to the second decoder 333, and the current differential data is obtained as a result of processing by the second decoder 333.

Feature data of previous differential data is input to the third preprocessing neural network 800, and feature data obtained through the third preprocessing neural network 800 is concatenated with feature data of a current optical flow and then is input to the first decoder 331. The first decoder 331 outputs the current optical flow by processing the input feature data.

In the embodiment of the disclosure shown in FIG. 8, the previous differential data is used to reconstruct the current optical flow. That is, the performance of reconstructing the current optical flow may be improved by using the feature data of the previous differential data which is correlated with the current optical flow.

To describe the correlation between the previous differential data and the current optical flow, initially, because the current optical flow is obtained using a current image and a previous reconstructed image, the previous differential data is obtained using a previous image and a previous predicted image, and the previous reconstructed image corresponds to the previous image, it is shown that both of the previous differential data and the current optical flow include information about the previous image.

The third preprocessing neural network 800 may be used to change the domain of the feature data of the previous differential data, and compensate for a mismatch between the current optical flow and the previous differential data.

Specifically, the third preprocessing neural network 800 may change the feature data of the previous differential data from the differential data domain to the optical flow domain.

In addition, the third preprocessing neural network 800 may process the feature data of the previous differential data in such a manner that the feature data obtained through the third preprocessing neural network 800 is more similar to the feature data of the current optical flow. The mismatch between the feature data of the previous differential data and the feature data of the current optical flow may include, for example, a difference in sample values or a difference in sample positions, and the third preprocessing neural network 800 may compensate for this mismatch.

As illustrated in FIG. 8, the feature data of the current differential data is not used to reconstruct the current optical flow. As described below with reference to FIGS. 12 to 15, the image encoding apparatus 1200 may obtain the current differential data after the current optical flow is reconstructed. That is, according to embodiments, because the image encoding apparatus 1200 may not use the current differential data to reconstruct the current optical flow, the image decoding apparatus 300 does not use the feature data of the current differential data to reconstruct the current optical flow.

Figure 9:
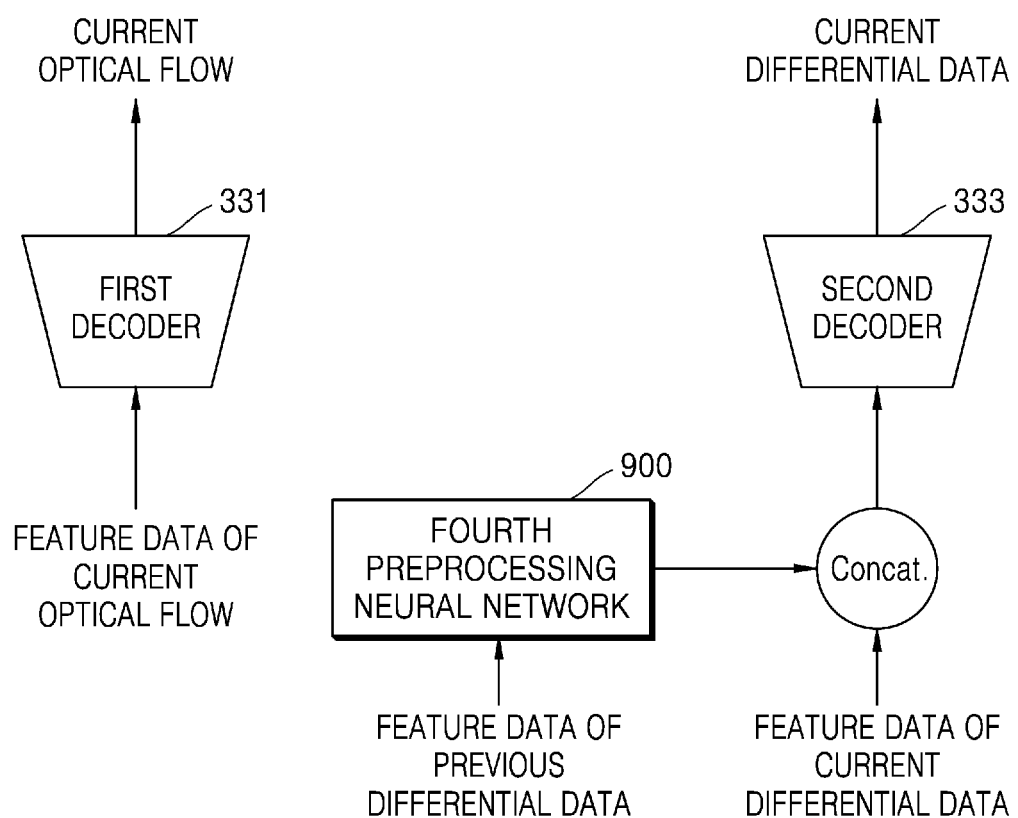
FIG. 9 is a diagram for describing a procedure of reconstructing current differential data by using a fourth preprocessing neural network, according to an embodiment.

FIG. 9 is a diagram for describing a procedure of reconstructing current differential data by using a fourth preprocessing neural network 900, according to an embodiment of the disclosure.

Referring to FIG. 9, feature data of a current optical flow is input to the first decoder 331, and the current optical flow is obtained as a result of processing by the first decoder 331.

Feature data of previous differential data is input to the fourth preprocessing neural network 900, and feature data obtained through the fourth preprocessing neural network 900 is concatenated with feature data of current differential data and then is input to the second decoder 333. The second decoder 333 outputs the current differential data by processing the input feature data.

In the embodiment of the disclosure shown in FIG. 9, the feature data of the previous differential data is used to reconstruct the current differential data. That is, the performance of reconstructing the current differential data may be improved by using the feature data of the previous differential data which is correlated with the current differential data.

As described above with reference to FIG. 2, an object in temporally consecutive images tends to move linearly, and thus the correlation between the current differential data and the previous differential data may be found.

The fourth preprocessing neural network 900 may be used to compensate for a mismatch between the feature data of the current differential data and the feature data of the previous differential data. Specifically, the fourth preprocessing neural network 900 may process the feature data of the previous differential data in such a manner that the feature data obtained through the fourth preprocessing neural network 900 is more similar to the feature data of the current differential data. The mismatch between the feature data of the current differential data and the feature data of the previous differential data may include, for example, a difference in sample values or a difference in sample positions, and the fourth preprocessing neural network 900 may compensate for this mismatch.

Figure 10:
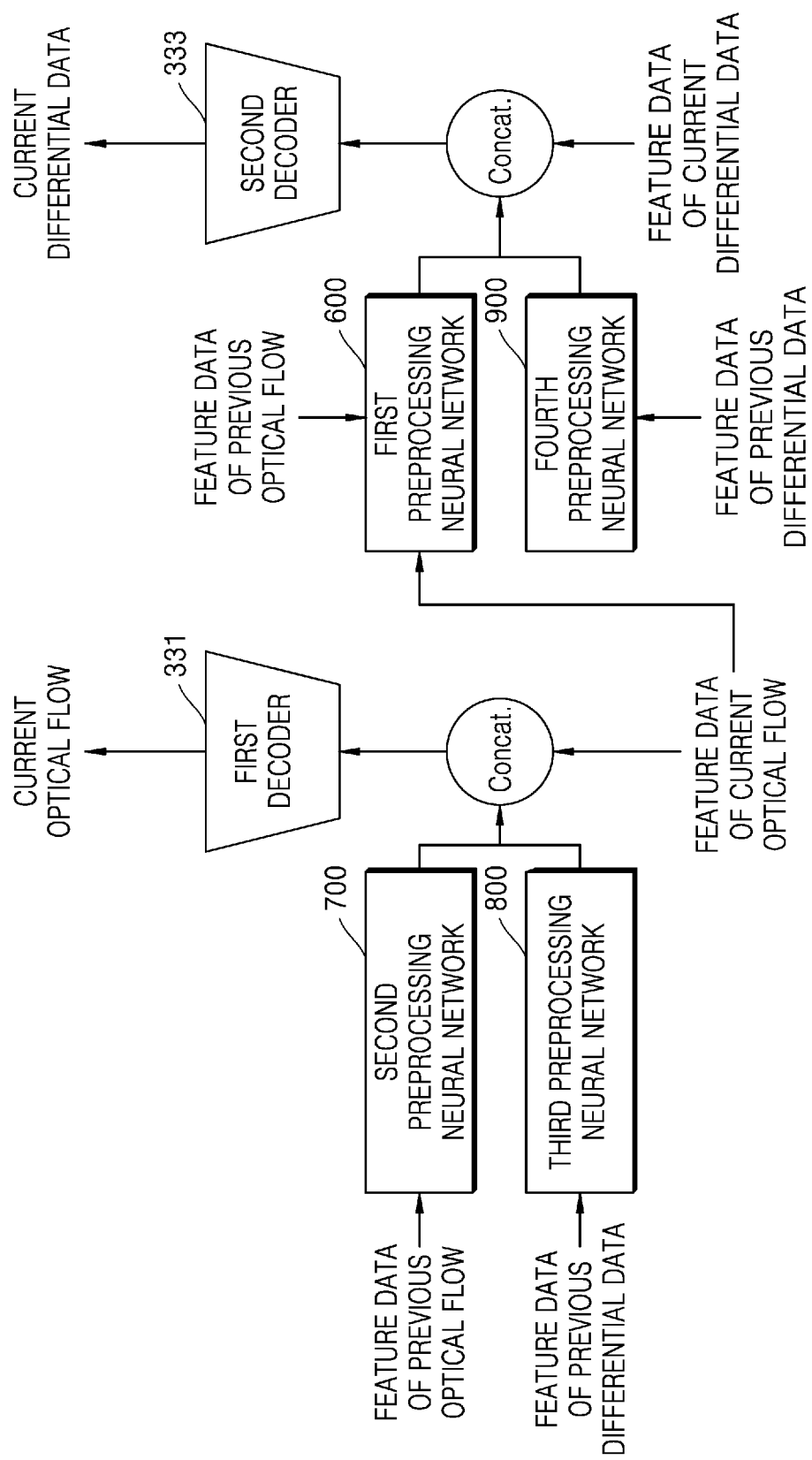
FIG. 10 is a diagram for describing a procedure of reconstructing a current optical flow and current differential data by using first, second, third, and fourth preprocessing neural networks, according to an embodiment.

FIG. 10 is a diagram for describing a procedure of reconstructing a current optical flow and current differential data by using the first preprocessing neural network 600, the second preprocessing neural network 700, the third preprocessing neural network 800, and the fourth preprocessing neural network 900, according to an embodiment of the disclosure.

The image decoding apparatus 300 may reconstructing a current optical flow and current differential data by using at least one of the first preprocessing neural network 600, the second preprocessing neural network 700, the third preprocessing neural network 800, or the fourth preprocessing neural network 900 described above.

FIG. 10 shows a procedure in which the image decoding apparatus 300 reconstructs the current optical flow and the current differential data by using all of the first preprocessing neural network 600, the second preprocessing neural network 700, the third preprocessing neural network 800, and the fourth preprocessing neural network 900.

As illustrated in FIG. 10, feature data of a previous optical flow is processed by the second preprocessing neural network 700, and feature data of previous differential data is processed by the third preprocessing neural network 800. Feature data output from the second preprocessing neural network 700 and the third preprocessing neural network 800 is concatenated with feature data of the current optical flow and then is input to the first decoder 331. The first decoder 331 reconstructs the current optical flow by processing the input feature data.

To describe data input to the second decoder 333, at least one of the feature data of the current optical flow or the feature data of the previous optical flow is processed by the first preprocessing neural network 600, and the feature data of the previous differential data is processed by the fourth preprocessing neural network 900. Feature data output from the first preprocessing neural network 600 and the fourth preprocessing neural network 900 is concatenated with feature data of the current differential data and then is input to the second decoder 333. The second decoder 333 reconstructs the current differential data by processing the input feature data.

Although all of the first preprocessing neural network 600, the second preprocessing neural network 700, the third preprocessing neural network 800, and the fourth preprocessing neural network 900 are used to reconstruct the current optical flow and the current differential data in FIG. 10, FIG. 10 is merely an example and at least one of the first preprocessing neural network 600, the second preprocessing neural network 700, the third preprocessing neural network 800, or the fourth preprocessing neural network 900 may not be used by the image decoding apparatus 300.

Figure 11:
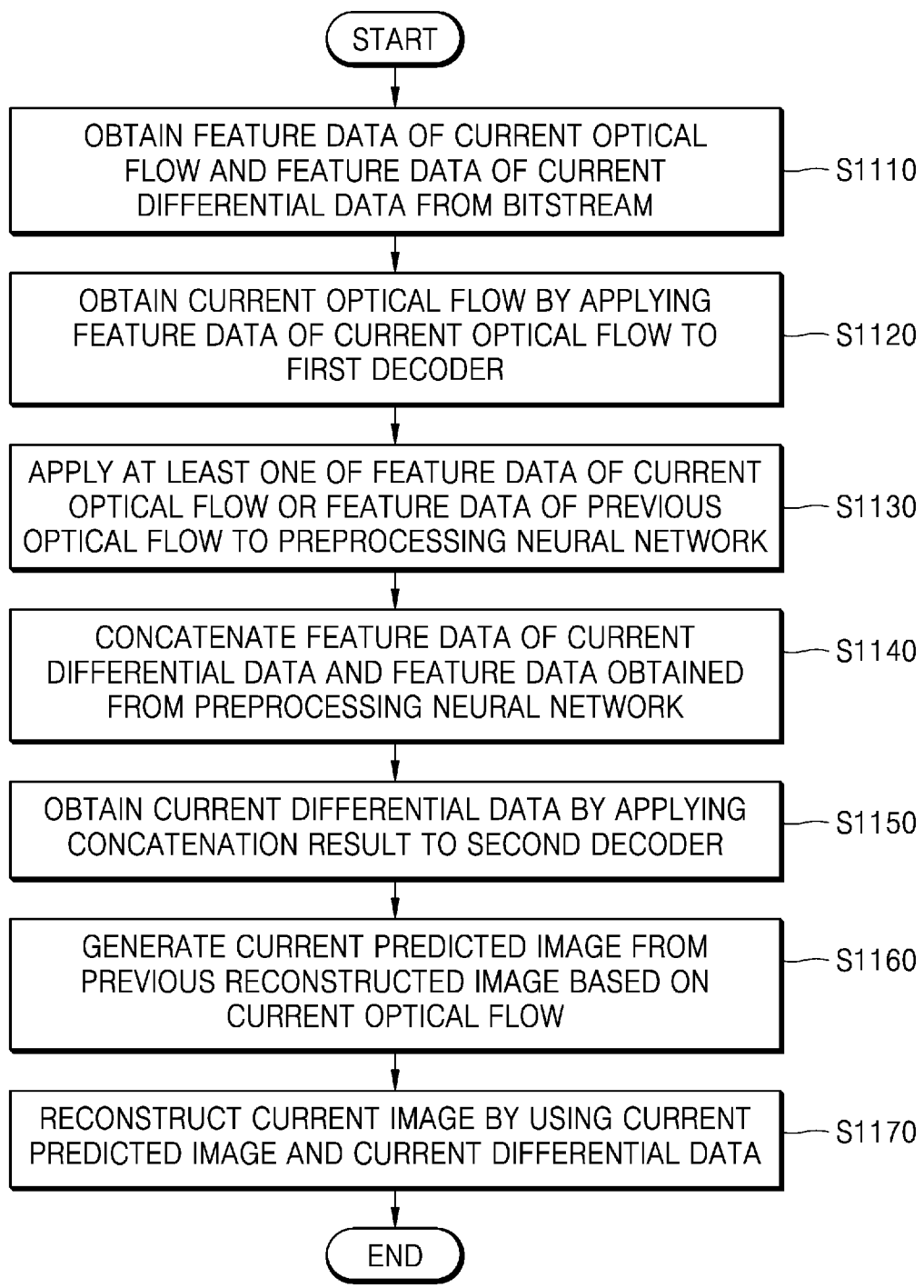
FIG. 11 is a flowchart of an image decoding method according to an embodiment.

FIG. 11 is a flowchart of an image decoding method according to an embodiment of the disclosure.

In operation S1110, the image decoding apparatus 300 obtains feature data of a current optical flow and feature data of current differential data by using a bitstream.

The image decoding apparatus 300 may obtain the feature data of the current optical flow and the feature data of the current differential data by applying at least one of inverse binarization, entropy decoding, inverse quantization, or inverse transformation to bins included in the bitstream.

In operation S1120, the image decoding apparatus 300 obtains the current optical flow by applying the feature data of the current optical flow to the first decoder 331.

In an embodiment of the disclosure, as described above in relation to FIGS. 7 and 8, at least one of feature data of a previous optical flow or feature data of previous differential data may be processed by a preprocessing neural network and then be input to the first decoder 331 together with the feature data of the current optical flow.

In operation S1130, the image decoding apparatus 300 applies at least one of the feature data of the current optical flow or the feature data of the previous optical flow to the preprocessing neural network.

In operation S1140, the image decoding apparatus 300 concatenates the feature data of the current differential data and feature data obtained from the preprocessing neural network. In an embodiment of the disclosure, as described above in relation to FIG. 9, the feature data of the previous differential data may also be processed by the preprocessing neural network and then be concatenated with the feature data of the current differential data.

In operation S1150, the image decoding apparatus 300 obtains the current differential data by applying the concatenation result to the second decoder 333.

In operation S1160, the image decoding apparatus 300 generates a current predicted image by using a previous reconstructed image based on the current optical flow. In an embodiment of the disclosure, the image decoding apparatus 300 may generate the current predicted image by warping the previous reconstructed image based on the current optical flow.

In operation S1170, the image decoding apparatus 300 reconstruct a current image by using the current predicted image and the current differential data. In an embodiment of the disclosure, the image decoding apparatus 300 may reconstruct the current image by summing sample values of the current predicted image and sample values of the current differential data.

An example of an operation of the image encoding apparatus 1200 will now be described with reference to FIGS. 12 to 15.

Figure 12:
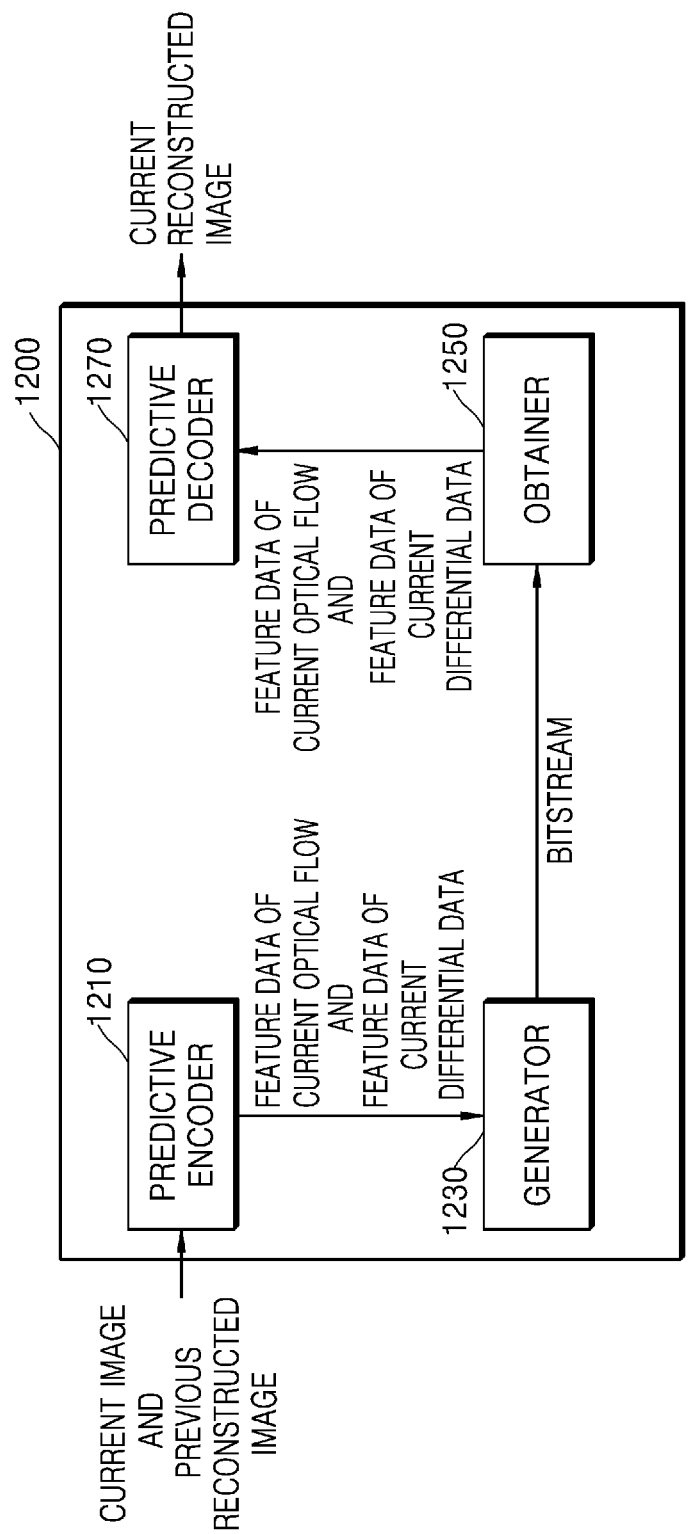
FIG. 12 is a block diagram of an image encoding apparatus according to an embodiment.

FIG. 12 is a block diagram of the image encoding apparatus 1200 according to an embodiment of the disclosure.

Referring to FIG. 12, the image encoding apparatus 1200 includes a predictive encoder 1210, a generator 1230, an obtainer 1250, and a predictive decoder 1270.

The predictive encoder 1210, the generator 1230, the obtainer 1250, and the predictive decoder 1270 may be implemented as processors, and operate based on instructions stored in a memory.

Although the predictive encoder 1210, the generator 1230, the obtainer 1250, and the predictive decoder 1270 are individually illustrated in FIG. 12, the predictive encoder 1210, the generator 1230, the obtainer 1250, and the predictive decoder 1270 may be implemented as one element, for example one processor. In this case, the predictive encoder 1210, the generator 1230, the obtainer 1250, and the predictive decoder 1270 may be implemented as a dedicated processor, or a combination of software and a general-purpose processor such as an AP, a CPU, or a GPU. The dedicated processor may include a memory to implement an embodiment of the disclosure, or include a memory processor to use an external memory.

The predictive encoder 1210, the generator 1230, the obtainer 1250, and the predictive decoder 1270 may be implemented as a plurality of processors. In this case, the predictive encoder 1210, the generator 1230, the obtainer 1250, and the predictive decoder 1270 may be implemented as a combination of dedicated processors, or a combination of software and general-purpose processors such as APs, CPUs, or GPUs.

The predictive encoder 1210 obtains feature data of a current optical flow and feature data of current differential data by using a current image and a previous reconstructed image.

Figure 13:
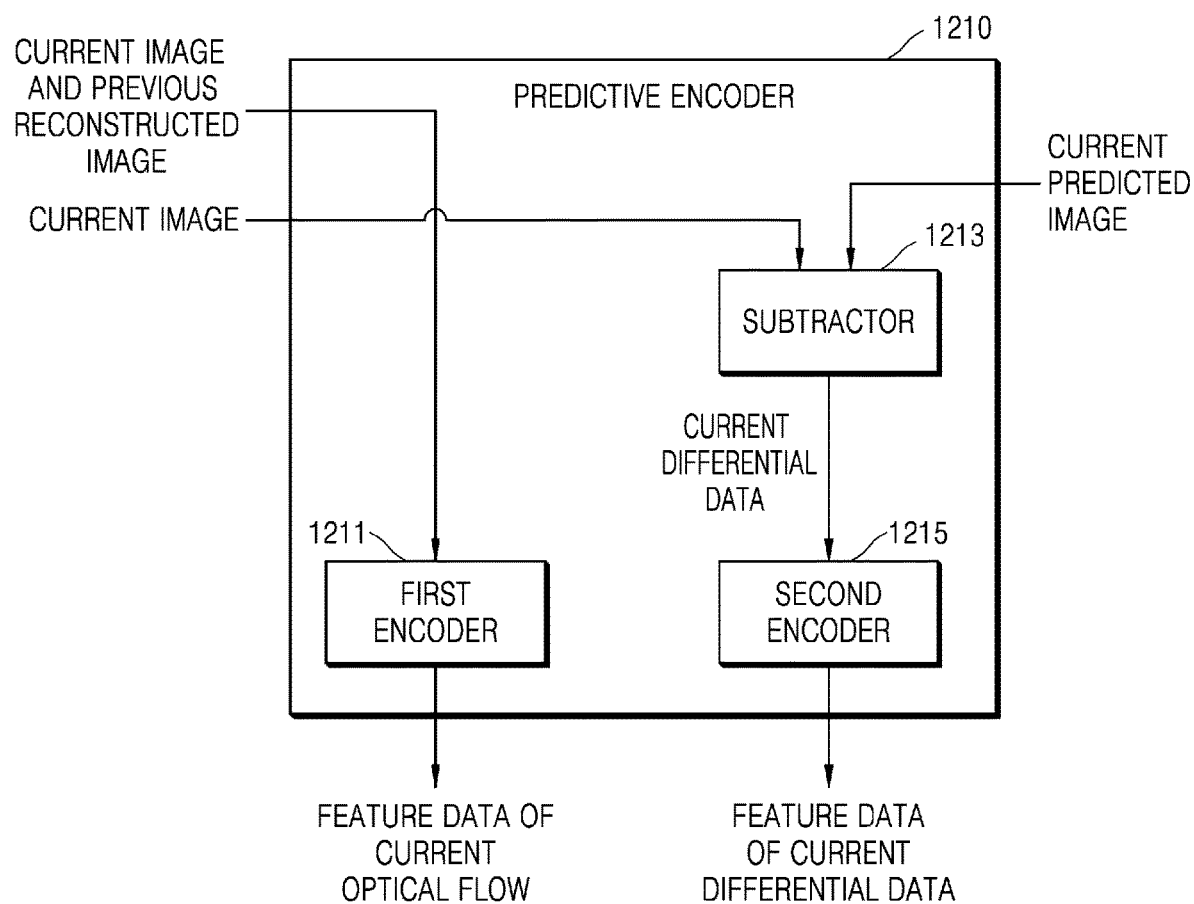
FIG. 13 is a block diagram of a predictive encoder illustrated in FIG. 12, according to an embodiment.

The predictive encoder 1210 may use a neural-network-based first encoder 1211 and a neural-network-based second encoder 1215, as shown for example in FIG. 13, to obtain the feature data of the current optical flow and the feature data of the current differential data.

The feature data of the current optical flow and the feature data of the current differential data obtained by the predictive encoder 1210 are transmitted to the generator 1230.

The generator 1230 generates a bitstream by using the feature data of the current optical flow and the feature data of the current differential data. In an embodiment of the disclosure, the generator 1230 may generate a first bitstream corresponding to the feature data of the current optical flow, and a second bitstream corresponding to the feature data of the current differential data.

The bitstream may be transmitted to the image decoding apparatus 300 through a network. In an embodiment of the disclosure, the bitstream may be recorded on a data storage medium including a magnetic medium (e.g., a hard disk, a floppy disk, or magnetic tape), an optical medium (e.g., a CD-ROM or a DVD), or a magneto-optical medium (e.g., a floptical disk).

The obtainer 1250 obtains the feature data of the current optical flow and the feature data of the current differential data from the bitstream generated by the generator 1230.

The feature data of the current optical flow and the feature data of the current differential data are transmitted to the predictive decoder 1270, and the predictive decoder 1270 obtains a current reconstructed image by using the feature data of the current optical flow and the feature data of the current differential data.

Operations of the obtainer 1250 and the predictive decoder 1270 may correspond to the operations of the obtainer 310 and the predictive decoder 330 illustrated in FIGS. 3 to 5, and thus a detailed description thereof is not provided herein.

An example of the predictive encoder 1210 and the generator 1230 will now be described in detail with reference to FIGS. 13 and 14.

FIG. 13 is a block diagram of the predictive encoder 1210 illustrated in FIG. 12.

The predictive encoder 1210 includes a first encoder 1211, a second encoder 1215, and a subtractor 1213.

Referring to FIG. 13, a current image and a previous reconstructed image are input to the first encoder 1211, and the first encoder 1211 outputs feature data of a current optical flow by processing the current image and the previous reconstructed image based on parameters set as a result of training.

The current image and a current predicted image generated using the previous reconstructed image based on the current optical flow by the predictive decoder 1270 are provided to the subtractor 1213.

The subtractor 1213 obtains current differential data between the current image and the current predicted image. The subtractor 1213 may obtain the current differential data by subtracting sample values of the current predicted image from sample values of the current image.

The current differential data is input to the second encoder 1215, and the second encoder 1215 outputs feature data of the current differential data by processing the current differential data based on parameters set as a result of training.

The generator 1230 generates a bitstream based on the feature data of the current optical flow and the feature data of the current differential data output from the predictive encoder 1210.

Figure 14:
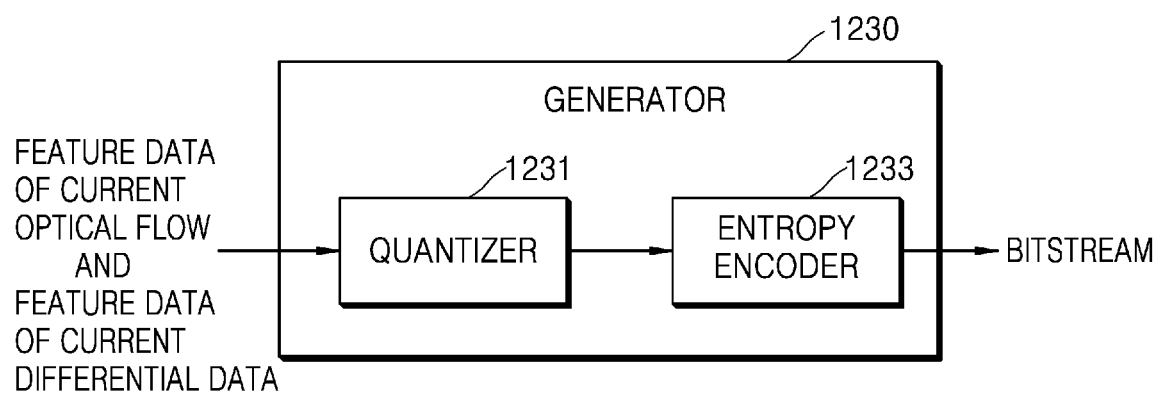
FIG. 14 is a block diagram of a generator illustrated in FIG. 12, according to an embodiment.

FIG. 14 is a block diagram of the generator 1230 illustrated in FIG. 12.

Referring to FIG. 14, the generator 1230 includes a quantizer 1231 and an entropy encoder 1233.

The quantizer 1231 quantizes feature data of a current optical flow and feature data of current differential data.

The entropy encoder 1233 generates a bitstream by entropy-encoding the quantized feature data of the current optical flow and the quantized feature data of the current differential data.

Depending on implementation, in embodiments the generator 1230 may further include a transformer. The transformer transforms the feature data of the current optical flow and the feature data of the current differential data from the spatial domain to the frequency domain, and provide the transformed feature data to the quantizer 1231.

Depending on implementation, in embodiments the generator 1230 may not include the quantizer 1231. That is, the bitstream corresponding to the feature data of the current optical flow and the feature data of the current differential data may be obtained through processing by the entropy encoder 1233.

Depending on implementation, in embodiments the generator 1230 may generate the bitstream only by binarizing the feature data of the current optical flow and the feature data of the current differential data. That is, when the generator 1230 performs only binarization, the quantizer 1231 and the entropy encoder 1233 may not be included in the generator 1230.

Figure 15:
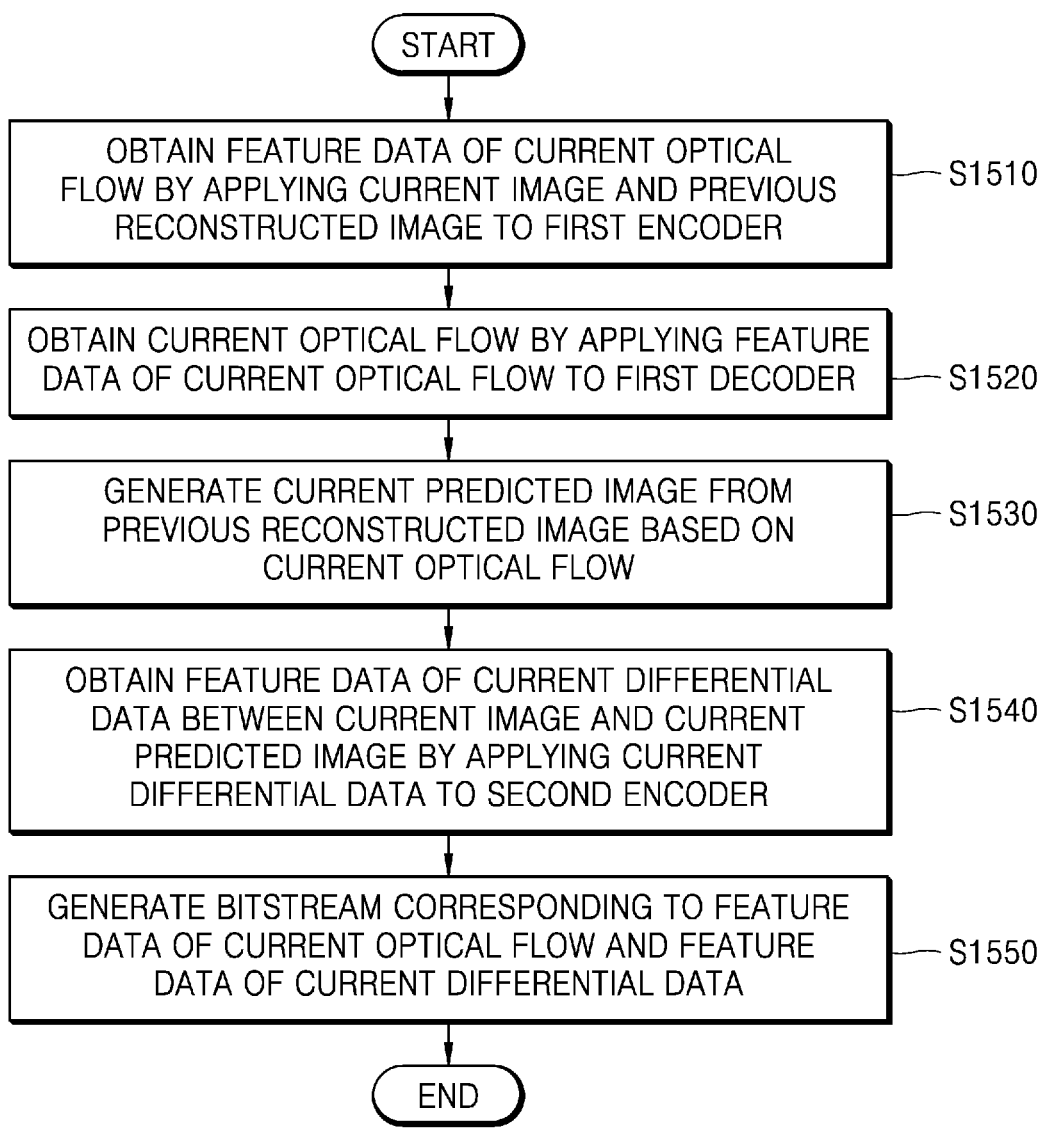
FIG. 15 is a flowchart of an image encoding method according to an embodiment.

FIG. 15 is a flowchart of an image encoding method according to an embodiment of the disclosure.

In operation S1510, the image encoding apparatus 1200 obtains feature data of a current optical flow by applying a current image and a previous reconstructed image to the neural-network-based first encoder 1211. The current image and the previous reconstructed image may be concatenated and then be input to the first encoder 1211.

In operation S1520, the image encoding apparatus 1200 obtains the current optical flow by applying the feature data of the current optical flow to the neural-network-based first decoder 331. In an embodiment of the disclosure, the image encoding apparatus 1200 may generate a bitstream corresponding to the feature data of the current optical flow, obtain the feature data of the current optical flow by using the generated bitstream, and input the feature data of the current optical flow to the first decoder 331. Accordingly, the image encoding apparatus 1200 may reconstruct the current optical flow in the same manner as the current optical flow reconstruction procedure by the image decoding apparatus 300.

To obtain the current optical flow, as described above with reference to FIGS. 7 and 8, at least one of feature data of a previous optical flow or feature data of previous differential data may be processed by a preprocessing neural network, and the processing result may be concatenated with the feature data of the current optical flow and then be input to the first decoder 331.

In operation S1530, the image encoding apparatus 1200 generates a current predicted image by using the previous reconstructed image based on the current optical flow. In an embodiment of the disclosure, the image encoding apparatus 1200 may generate the current predicted image by warping the previous reconstructed image based on the current optical flow.

In operation S1540, the image encoding apparatus 1200 obtains feature data of current differential data between the current image and the current predicted image by applying the current differential data to the neural-network-based second encoder 1215.

In operation S1550, the image encoding apparatus 1200 generates a bitstream corresponding to the feature data of the current optical flow and the feature data of the current differential data.

The image encoding apparatus 1200 may reconstruct the current differential data by applying the feature data of the current differential data to the second decoder 333. In this case, as described above with reference to FIGS. 6 and 9, at least one of the feature data of the current optical flow, the feature data of the previous optical flow, or the feature data of the previous differential data may be processed by the preprocessing neural network, and the processing result may be concatenated with the feature data of the current differential data and then be input to the second decoder 333.

The image encoding apparatus 1200 may obtain a current reconstructed image by combining the current predicted image and the current differential data, and use the current reconstructed image to encode a next image.

The first encoder 1211, the second encoder 1215, the first decoder 331, the second decoder 333, and the first preprocessing neural network 600, the second preprocessing neural network 700, the third preprocessing neural network 800, and the fourth preprocessing neural network 900 described above may include at least one convolutional layer. An example of an available architecture of the first encoder 1211, the second encoder 1215, the first decoder 331, the second decoder 333, and the first preprocessing neural network 600, the second preprocessing neural network 700, the third preprocessing neural network 800, and the fourth preprocessing neural network 900 will now be described with reference to FIG. 16.

Figure 16:
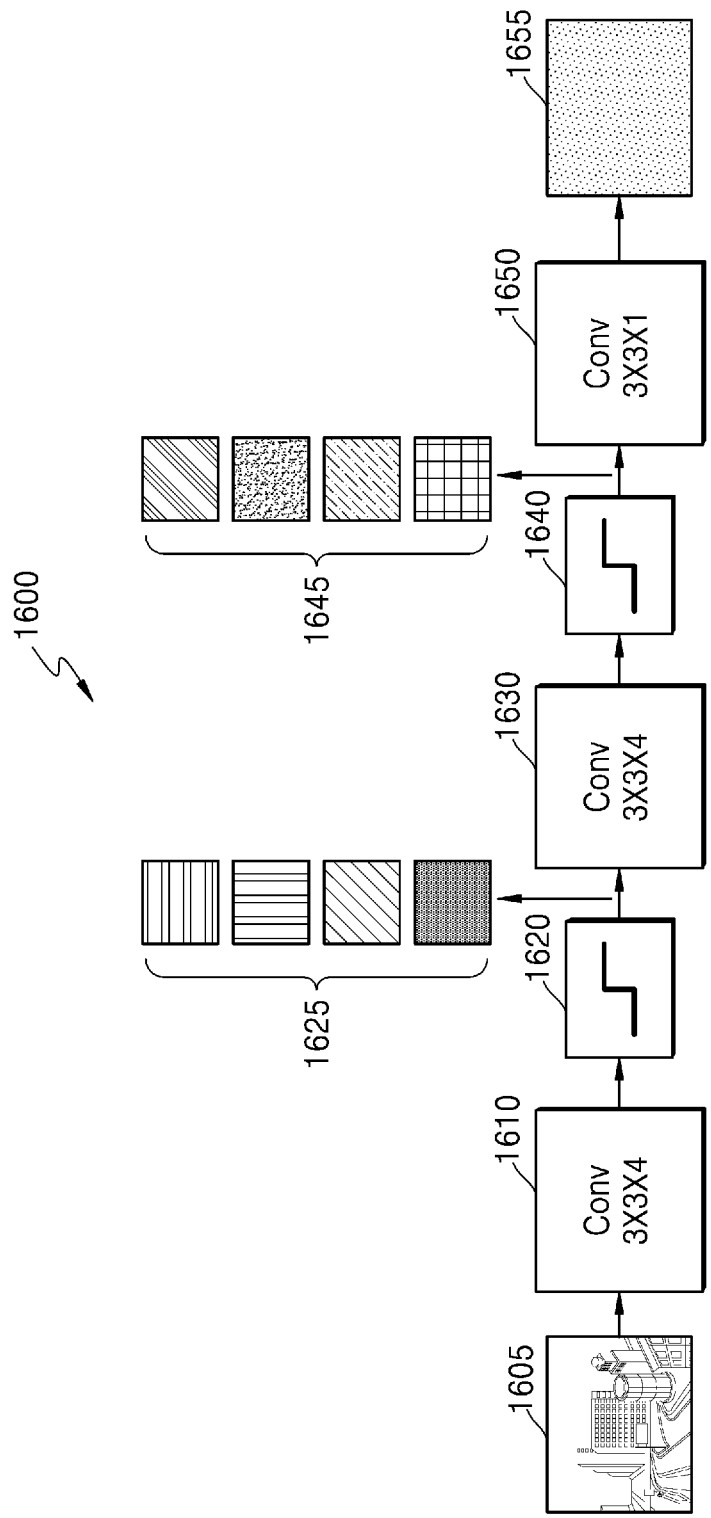
FIG. 16 is a diagram showing an example of an architecture of a neural network, according to an embodiment.

FIG. 16 is a diagram showing an example of an architecture of a neural network 1600, according to an embodiment of the disclosure.

As illustrated in FIG. 16, input data 1605 is input to a first convolutional layer 1610. Herein, the input data 1605 varies depending on whether the neural network 1600 serves as the first encoder 1211, the second encoder 1215, the first decoder 331, the second decoder 333, the first preprocessing neural network 600, the second preprocessing neural network 700, the third preprocessing neural network 800, or the fourth preprocessing neural network 900.

For example, when the neural network 1600 serves as the first encoder 1211, the input data 1605 may correspond to a result of concatenating a current image and a previous reconstructed image. As another example, when the neural network 1600 serves as the second encoder 1215, the input data 1605 may correspond to current differential data.

3×3×4 marked on the first convolutional layer 1610 illustrated in FIG. 16 represents that convolution is performed on one piece of input data 1605 by using four 3×3 filter kernels. Four feature maps are generated as the convolution result. The feature maps generated by the first convolutional layer 1610 represent unique features of the input data 1605. For example, each feature map may represent vertical features, horizontal features, or edge features of the input data 1605.

An example of a convolution operation performed by the first convolutional layer 1610 will now be described in detail with reference to FIG. 17.

One feature map 1750 may be generated by performing multiplication and addition between parameters of a 3×3 filter kernel 1730 used by the first convolutional layer 1610, and sample values in the input data 1605 corresponding thereto. Because the first convolutional layer 1610 uses four filter kernels 1730, four feature maps 1750 may be generated by performing convolution using the four filter kernels 1730.

Figure 17:
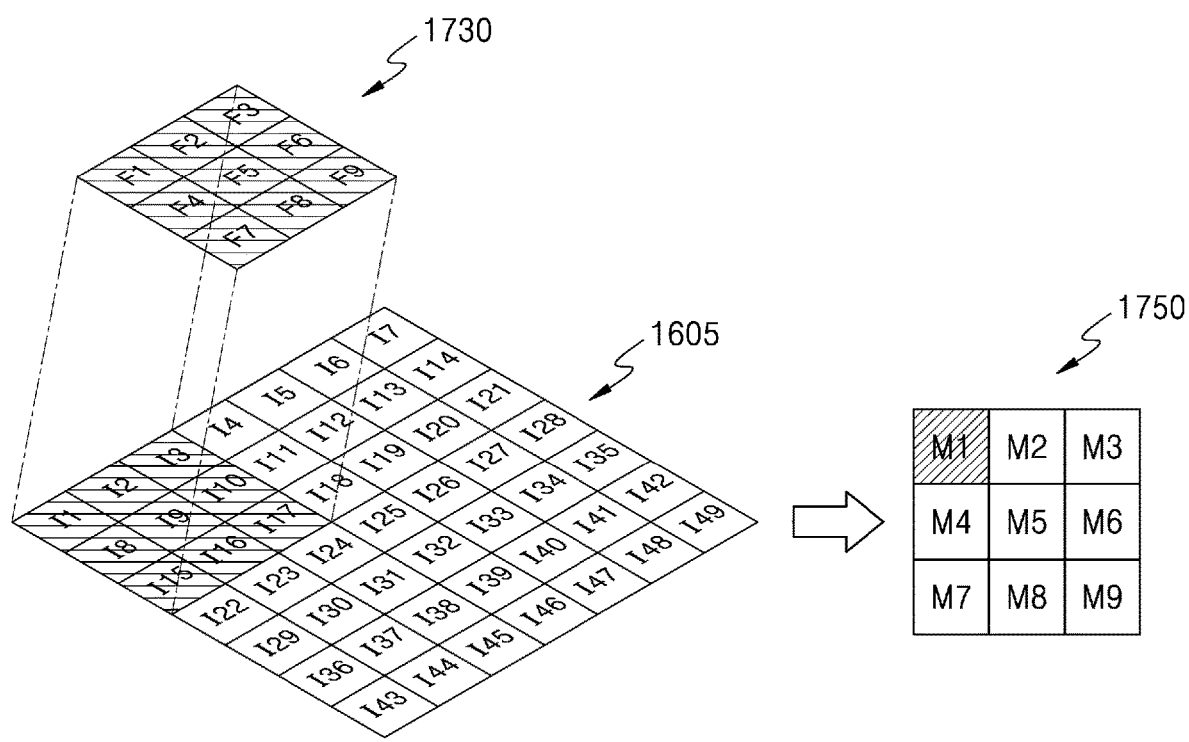
FIG. 17 is a diagram for describing a convolution operation performed by a convolutional layer illustrated in FIG. 16, according to an embodiment.

I1 to I49 marked on the input data 1605 in FIG. 17 indicate samples of the input data 1605, and F1 to F9 marked on the filter kernel 1730 indicate samples, which may also be referred to as parameters, of the filter kernel 1730. M1 to M9 marked on the feature map 1750 indicate samples of the feature map 1750.

In the convolution operation, sample values I1, I2, I3, I8, I9, I10, I15, I16, and I17 of the input data 1605 may be multiplied by F1, F2, F3, F4, F5, F6, F7, F8, and F9 of the filter kernel 1730, respectively, and a value obtained by combining (e.g., adding) the resultant values of multiplication may be assigned as the value of M1 of the feature map 1750. When a stride of 2 is set for convolution, sample values I3, I4, I5, I10, I11, I12, I17, I18, and I19 of the input data 1605 may be multiplied by F1, F2, F3, F4, F5, F6, F7, F8, and F9 of the filter kernel 1730, respectively, and a value obtained by combining the resultant values of multiplication may be assigned as the value of M2 of the feature map 1750.

By performing convolution between the sample values in the input data 1605 and the samples of the filter kernel 1730 while the filter kernel 1730 is moving based on the stride to the last sample of the input data 1605, the feature map 1750 having a certain size may be obtained.

According to the disclosure, values of parameters of the neural network 1600, e.g., samples of the filter kernel 1730 (e.g., F1, F2, F3, F4, F5, F6, F7, F8, and F9 of the filter kernel 1730) used by convolutional layers of the neural network 1600, may be optimized by training the neural network 1600.

Although the convolutional layers included in the neural network 1600 may perform the convolution operation described in relation to FIG. 17, the convolution operation described in relation to FIG. 17 is merely an example, and embodiments are not limited thereto.

Referring back to FIG. 16, the feature maps of the first convolutional layer 1610 are input to a first activation layer 1620.

The first activation layer 1620 may give non-linear features to each feature map. The first activation layer 1620 may include a sigmoid function, a hyperbolic tangent (tan h) function, a rectified linear unit (ReLU) function, etc., but embodiments are not limited thereto.

When the first activation layer 1620 gives non-linear features, this may mean that some sample values of the feature maps are changed and output. In this case, the change is performed by applying non-linear features.

The first activation layer 1620 determines whether to transmit the sample values of the feature maps to a second convolutional layer 1630. For example, some sample values of the feature maps are activated by the first activation layer 1620 and transmitted to the second convolutional layer 1630, and the other sample values are inactivated by the first activation layer 1620 and not transmitted to the second convolutional layer 1630. The unique features of the input data 1605 represented by the feature maps are emphasized by the first activation layer 1620.

Feature maps 1625 output from the first activation layer 1620 are input to the second convolutional layer 1630. Any one of the feature maps 1625 illustrated in FIG. 16 is a result of processing the feature map 1750 of FIG. 17 by the first activation layer 1620.

The indication "3×3×4" marked on the second convolutional layer 1630 may indicate that convolution is performed on input feature maps by using four 3×3 filter kernels. The output of the second convolutional layer 1630 is input to a second activation layer 1640. The second activation layer 1640 may give non-linear features to the input feature maps.

Feature maps 1645 output from the second activation layer 1640 are input to a third convolutional layer 1650. The indication "3×3×1" marked on the third convolutional layer 1650 may indicate that convolution is performed to generate one piece of output data 1655 by using one 3×3 filter kernel.

The output data 1655 varies depending on whether the neural network 1600 serves as the first encoder 1211, the second encoder 1215, the first decoder 331, the second decoder 333, the first preprocessing neural network 600, the second preprocessing neural network 700, the third preprocessing neural network 800, or the fourth preprocessing neural network 900.

For example, when the neural network 1600 serves as the first encoder 1211, the output data 1655 may be feature data of a current optical flow. As another example, when the neural network 1600 serves as the second encoder 1215, the output data 1655 may be feature data of current differential data.

Although the neural network 1600 includes three convolutional layers and two activation layers in FIG. 16, FIG. 16 is merely an example and, depending on implementation, in embodiments the numbers of convolutional layers and activation layers included in the neural network 1600 may be variously changed.

Depending on implementation, in embodiments the neural network 1600 may be implemented as a recurrent neural network (RNN). This means that the neural network 1600 according to an embodiment of the disclosure may be changed from a convolutional neural network (CNN) architecture to an RNN architecture.

In an embodiment of the disclosure, the image decoding apparatus 300 and the image encoding apparatus 1200 may include at least one arithmetic logic unit (ALU) for the above-described convolution and activation operations.

The ALU may be implemented as a processor. For the convolution operation, the ALU may include a multiplier for multiplying sample values of a filter kernel by the input data 1605 or sample values of a feature map output from a previous layer, and an adder for adding the resultant values of multiplication.

For the activation operation, the ALU may include a multiplier for multiplying input sample values by weights used for a predetermined sigmoid, tan h, or ReLU function, and a comparer for comparing the multiplication result to a certain value to determine whether to transmit input sample values to a next layer.

An example of a method of training neural networks used in an image encoding and decoding procedure will now be described with reference to FIGS. 18 and 19.

Figure 18:
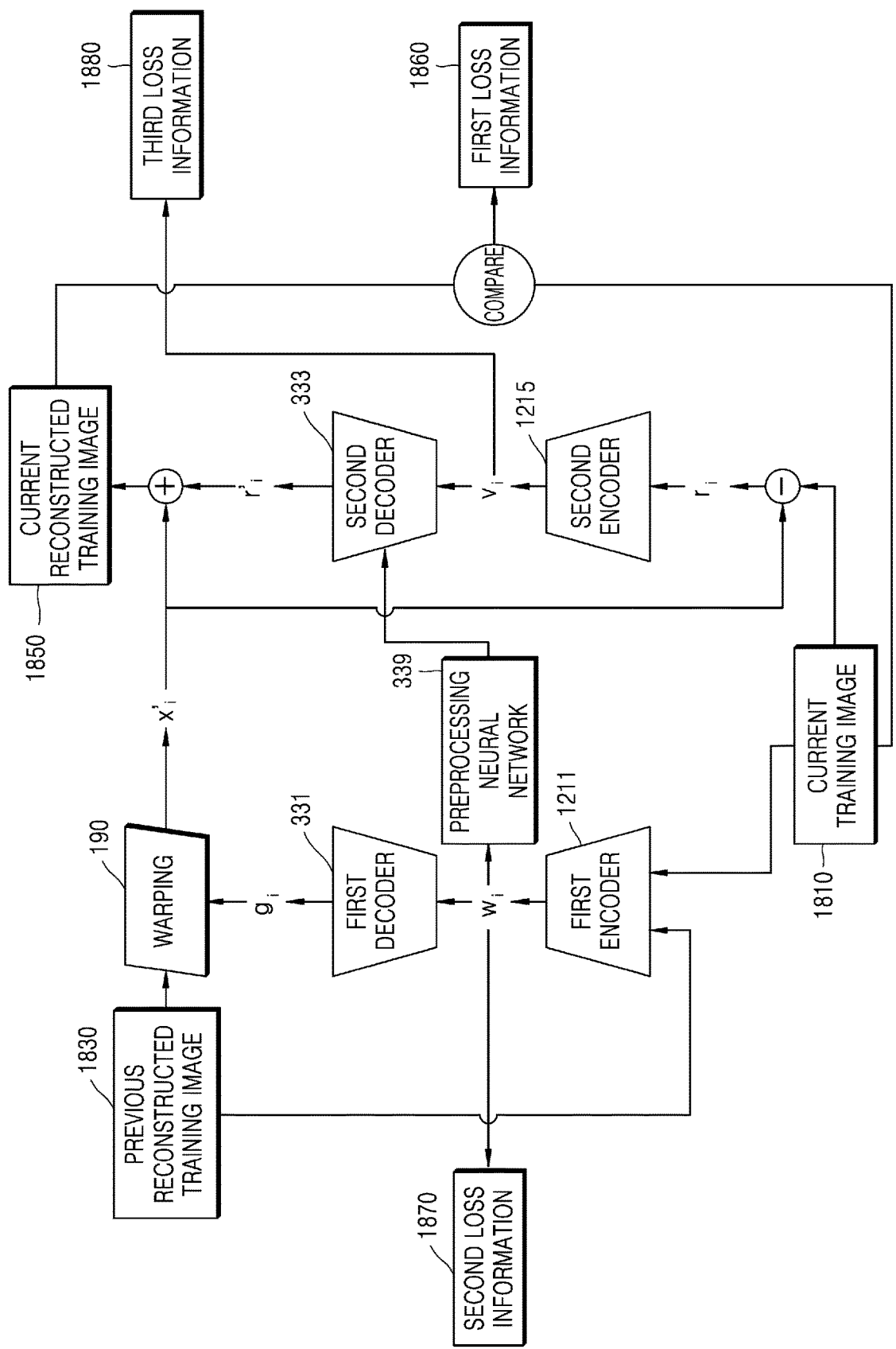
FIG. 18 is a diagram for describing a method of training a first decoder, a second decoder, a first encoder, a second encoder, and a preprocessing neural network, according to an embodiment.

FIG. 18 is a diagram for describing a method of training the first decoder 331, the second decoder 333, the first encoder 1211, the second encoder 1215, and the preprocessing neural network 339.

In FIG. 18, a current training image 1810, a previous reconstructed training image 1830, and a current reconstructed training image 1850 correspond to the current image, the previous reconstructed image, and the current reconstructed image described above, respectively.

In training the first decoder 331, the second decoder 333, the first encoder 1211, the second encoder 1215, and the preprocessing neural network 339, similarity between the current reconstructed training image 1850 and the current training image 1810 and a bitrate of a bitstream to be generated by encoding the current training image 1810 may be considered. To this end, in an embodiment of the disclosure, the first decoder 331, the second decoder 333, the first encoder 1211, the second encoder 1215, and the preprocessing neural network 339 may be trained based on first loss information 1860 corresponding to the similarity between the current training image 1810 and the current reconstructed training image 1850, and second loss information 1870 and third loss information 1880 corresponding to the size of the bitstream.

Referring to FIG. 18, the current training image 1810 and the previous reconstructed training image 1830 are input to the first encoder 1211. The first encoder 1211 outputs feature data $w_i$ of a current optical flow by processing the current training image 1810 and the previous reconstructed training image 1830.

The feature data $w_i$ of the current optical flow is input to the first decoder 331, and the first decoder 331 outputs a current optical flow $g_i$ by processing the feature data $w_i$ of the current optical flow.

A current predicted training image $x'_i$ is generated by warping, for example by the warping 190, the previous reconstructed training image 1830 based on the current optical flow $g_i$, and current differential data $r_i$ corresponding to a difference between the current predicted training image $x'_i$ and the current training image 1810 is obtained.

The current differential data $r_i$ is input to the second encoder 1215, and the second encoder 1215 outputs feature data $v_i$ of the current differential data by processing the current differential data $r_i$.

A result of processing the feature data $w_i$ of the current optical flow by the preprocessing neural network 339 is concatenated with the feature data $v_i$ of the current differential data and is input to the second decoder 333.

The second decoder 333 outputs current differential data $r_i$ by processing the input data, and the current reconstructed training image 1850 is obtained by combining the current predicted training image $x'_i$ and the current differential data $r_i$.

To train the first decoder 331, the second decoder 333, the first encoder 1211, the second encoder 1215, and the preprocessing neural network 339, at least one of the first loss information 1860, the second loss information 1870, or the third loss information 1880 may be obtained.

The first loss information 1860 corresponds to a difference between the current training image 1810 and the current reconstructed training image 1850. The difference between the current training image 1810 and the current reconstructed training image 1850 may include at least one of an L1-norm value, an L2-norm value, a structural similarity (SSIM) value, a peak signal-to-noise ratio-human vision system (PSNR-HVS) value, a multiscale SSIM (MS-SSIM) value, a variance inflation factor (VIF) value, or a video multimethod assessment fusion (VMAF) value determined based on the current training image 1810 and the current reconstructed training image 1850.

Because the first loss information 1860 is related to the quality of the current reconstructed training image 1850, the first loss information 1860 may also be referred to as quality loss information.

The second loss information 1870 corresponds to entropy of the feature data $w_i$ of the current optical flow or a bitrate of a bitstream corresponding to the feature data w of the current optical flow. The third loss information 1880 corresponds to entropy of the feature data $v_i$ of the current differential data or a bitrate of a bitstream corresponding to the feature data $v_i$ of the current differential data.

Depending on implementation, in embodiments when a bitstream includes the feature data $w_i$ of the current optical flow and the feature data $v_i$ of the current differential data, fourth loss information corresponding to a bitrate of the bitstream may be calculated. In this case, the second loss information 1870 and the third loss information 1880 may not be used for training.

Because the second loss information 1870 and the third loss information 1880 are related to the efficiency of encoding the current training image 1810, the second loss information 1870 and the third loss information 1880 may be referred to as compression loss information.

The first decoder 331, the second decoder 333, the first encoder 1211, the second encoder 1215, and the preprocessing neural network 339 may be trained to reduce or minimize final loss information calculated using at least one of the first loss information 1860, the second loss information 1870, or the third loss information 1880.

Specifically, the first decoder 331, the second decoder 333, the first encoder 1211, the second encoder 1215, and the preprocessing neural network 339 may be trained to reduce or minimize the final loss information by changing the value of a preset parameter.

In an embodiment of the disclosure, the final loss information may be calculated based on Equation 1.

$$\text{Final Loss Information} = a \times \text{First Loss Information} + b \times \text{Second Loss Information} + c \times \text{Third Loss Information} \quad [\text{Equation 1}]$$

In Equation 1, a, b, and c denote weights applied to the first loss information 1860, the second loss information 1870, and the third loss information 1880, respectively.

Based on Equation 1, it is shown that the first decoder 331, the second decoder 333, the first encoder 1211, the second encoder 1215, and the preprocessing neural network 339 are trained in such a manner that the current reconstructed training image 1850 is as similar as possible to the current training image 1810 and that the size of a bitstream corresponding to data output from the first encoder 1211 and the second encoder 1215 is minimized.

As illustrated in FIG. 18, the preprocessing neural network 339 processes only the feature data $w_i$ of the current optical flow in FIG. 18, which is related to the embodiment of the disclosure shown in FIG. 6.

As described above, the image decoding apparatus 300 may use at least one of the first preprocessing neural network 600, the second preprocessing neural network 700, the third preprocessing neural network 800, or the fourth preprocessing neural network 900 to reconstruct the current optical flow $g_i$ and the current differential data $r_i$.

In this case, the at least one of the first preprocessing neural network 600, the second preprocessing neural network 700, the third preprocessing neural network 800, or the fourth preprocessing neural network 900 used to reconstruct the current optical flow $g_i$ and the current differential data $r_i$ need to be trained.

Therefore, in embodiments the first loss information 1860, the second loss information 1870, and the third loss information 1880 shown in FIG. 18 may be calculated using any preprocessing neural network from among the first preprocessing neural network 600, the second preprocessing neural network 700, the third preprocessing neural network 800, and the fourth preprocessing neural network 900 to reconstruct the current optical flow $g_i$ and the current differential data $r_i$. Accordingly, the preprocessing neural network may be trained based on the first loss information 1860, the second loss information 1870, and the third loss information 1880.

Figure 19:
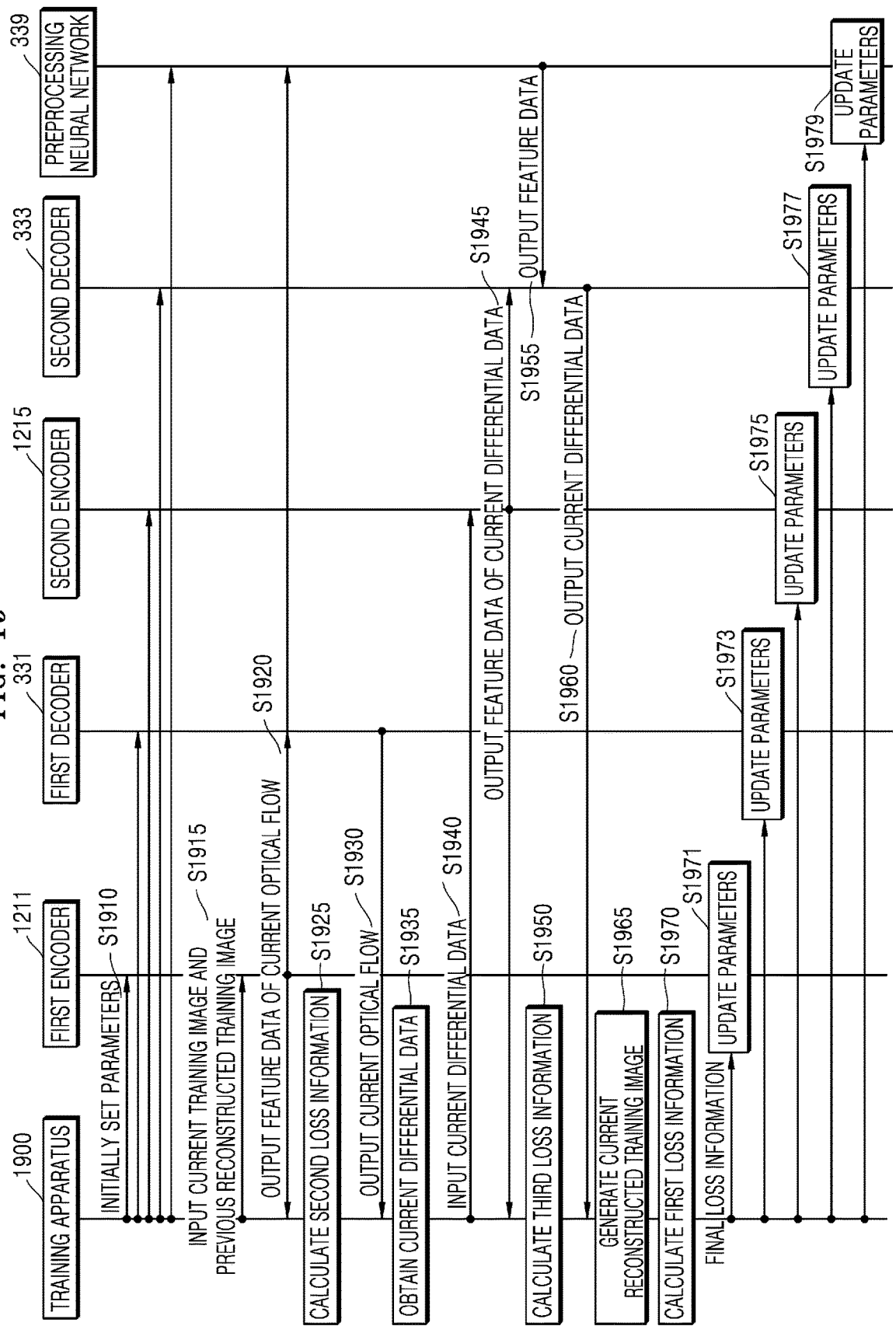
FIG. 19 is a diagram for describing a procedure, performed by a training apparatus, of training a first decoder, a second decoder, a first encoder, a second encoder, and a preprocessing neural network, according to an embodiment.

FIG. 19 is a diagram for describing a procedure, performed by a training apparatus 1900, of training the first decoder 331, the second decoder 333, the first encoder 1211, the second encoder 1215, and the preprocessing neural network 339.

The training procedure described above in relation to FIG. 18 may be performed by the training apparatus 1900. The training apparatus 1900 may be, for example, the image encoding apparatus 1200 or a separate server. Parameters obtained as a result of training may be stored in the image encoding apparatus 1200 and the image decoding apparatus 300.

Referring to FIG. 19, the training apparatus 1900 initially sets parameters of the first encoder 1211, the first decoder 331, the second encoder 1215, the second decoder 333, and the preprocessing neural network 339 at operation S1910. As such, the first encoder 1211, the first decoder 331, the second encoder 1215, the second decoder 333, and the preprocessing neural network 339 may operate based on the initially set parameters.

The training apparatus 1900 inputs the current training image 1810 and the previous reconstructed training image 1830 to the first encoder 1211 at operation S1915.

The first encoder 1211 outputs the feature data $w_i$ of the current optical flow to the training apparatus 1900, the first decoder 331, and the preprocessing neural network 339 at operation S1920.

The training apparatus 1900 calculates the second loss information 1870 by using the feature data $w_i$ of the current optical flow at operation S1925.

The first decoder 331 outputs the current optical flow $g_i$ to the training apparatus 1900 by processing the feature data $w_i$ of the current optical flow at operation S1930.

The training apparatus 1900 generates the current predicted training image $x'_i$ based on the current optical flow $g_i$, and obtains the current differential data n corresponding to a difference between the current predicted training image $x'_i$ and the current training image 1810 at operation S1935.

The training apparatus 1900 inputs the current differential data $r_i$ to the second encoder 1215 at operation S1940, and the second encoder 1215 outputs the feature data $v_i$ of the current differential data to the training apparatus 1900 and the second decoder 333 at operation S1945.

The training apparatus 1900 calculates the third loss information 1880 by using the feature data $v_i$ of the current differential data at operation S1950.

The preprocessing neural network 339 processes the feature data $w_i$ of the current optical flow received in operation S1920, and outputs feature data obtained as the processing result, to the second decoder 333 at operation S1955.

The second decoder 333 outputs the current differential data $r_i$ to the training apparatus 1900 by processing a result of concatenating the feature data $v_i$ of the current differential data and the feature data output from the preprocessing neural network 339 at operation S1960.

The training apparatus 1900 generates the current reconstructed training image 1850 by using the current differential data $r_i$ and the current predicted training image $x'_i$ at operation S1965.

The training apparatus 1900 calculates the first loss information 1860 corresponding to a difference between the current training image 1810 and the current reconstructed training image 1850 at operation S1970.

The training apparatus 1900 calculates final loss information by combining at least one of the first loss information 1860, the second loss information 1870, or the third loss information 1880, and the first decoder 331, the second decoder 333, the first encoder 1211, the second encoder 1215, and the preprocessing neural network 339 update the initially set parameters by performing back propagation based on the final loss information at operations S1971, S1973, S1975, S1977, and S1979.

Then, the training apparatus 1900, the first decoder 331, the second decoder 333, the first encoder 1211, the second encoder 1215, and the preprocessing neural network 339 update the parameters by iterating the procedure of operations S1915 to S1979 until the final loss information is minimized. At this time, in each iteration, the first decoder 331, the second decoder 333, the first encoder 1211, the second encoder 1215, and the preprocessing neural network 339 operate based on the parameters updated in a previous procedure.

The preprocessing neural network 339 processes only the feature data $w_i$ of the current optical flow in FIG. 19, which is related to the embodiment of the disclosure shown in FIG. 6.

As described above, the training apparatus 1900 may train at least one of the first preprocessing neural network 600, the second preprocessing neural network 700, the third preprocessing neural network 800, or the fourth preprocessing neural network 900. To this end, the training apparatus 1900 may control input data and output data of at least one of the first preprocessing neural network 600, the second preprocessing neural network 700, the third preprocessing neural network 800, or the fourth preprocessing neural network 900.

For example, to train the second preprocessing neural network 700 illustrated in FIG. 7, a result of processing feature data of a previous optical flow by the second preprocessing neural network 700 may be input to the first decoder 331. In S1930, the first decoder 331 may output the current optical flow $g_i$ by processing a result of concatenating the feature data $w_i$ of the current optical flow and the feature data output from the second preprocessing neural network 700.

As another example, to train the fourth preprocessing neural network 900 illustrated in FIG. 9, a result of processing feature data of previous differential data by the fourth preprocessing neural network 900 may be input to the second decoder 333 and, in operation S1960, the second decoder 333 may output current differential data by processing a result of concatenating feature data of the current differential data, the feature data output from the preprocessing neural network 339 and the feature data output from the fourth preprocessing neural network 900.

Table 1 compares bitrates of bitstreams generated through the inter prediction procedure shown in FIG. 1, marked "A" in Table 1, and the inter prediction procedure using the first preprocessing neural network 600, the second preprocessing neural network 700, the third preprocessing neural network 800, and the fourth preprocessing neural network 900, marked "B" in Table 1 according to an embodiment of the disclosure.

TABLE 1

| Validation sequences | | A | | B | | BD-rate (piecewise cubic) | BD-rate (cubic) |
|---|---|---|---|---|---|---|---|
| @720p | lambda | kbps | γ psnr | kbps | γ psnr | γ | γ |
| total | 0.00250 | 1.1839 | 41.63 | 0.8231 | 41.50 | −5.56% | −5.68% |
|  | 0.01000 | 0.4146 | 38.48 | 0.3871 | 38.29 | | |
|  | 0.04000 | 0.1877 | 35.10 | 0.1834 | 35.06 | | |
|  | 0.16000 | 0.0903 | 31.48 | 0.0905 | 31.78 | | |

As compared in Table 1, it is shown that the bitrate of the bitstream is reduced by about −5.5% when the first preprocessing neural network 600, the second preprocessing neural network 700, the third preprocessing neural network 800, and the fourth preprocessing neural network 900 are used, compared to the inter prediction procedure described above in relation to FIG. 1.

Meanwhile, the afore-described embodiments of the disclosure may be written as a computer-executable program, and the written program may be stored in a machine-readable storage medium.

A machine-readable storage medium may be provided in the form of a non-transitory storage medium. When the storage medium is 'non-transitory', it means that the storage medium is tangible and does not include signals (e.g., electromagnetic waves), and it does not limit that data is semi-permanently or temporarily stored in the storage medium. For example, the 'non-transitory storage medium' may include a buffer storing data temporarily.

According to an embodiment of the disclosure, the method according to various embodiments of the disclosure may be included and provided in a computer program product. The computer program product may be traded as a commercial product between sellers and purchasers. The computer program product may be distributed in the form of a machine-readable storage medium (e.g., a compact disc read only memory (CD-ROM)), or be electronically distributed (e.g., downloaded or uploaded) via an application store or directly between two user devices (e.g., smartphones). For electronic distribution, at least a part of the computer program product (e.g., a downloadable app) may be temporarily generated or be at least temporarily stored in a machine-readable storage medium, e.g., a memory of a server of a manufacturer, a server of an application store, or a relay server.

While embodiments have been particularly shown and described herein, it will be understood by one of ordinary skill in the art that various changes in form and details may be made therein without departing from the scope of the disclosure as defined by the following claims.

What is claimed is:

1. An image decoding method using artificial intelligence (AI), the image decoding method comprising:
obtaining feature data of a current optical flow and feature data of current differential data from a bitstream corresponding to a current image;
applying feature data of a previous optical flow to a first preprocessing neural network;
obtaining a first concatenation result by concatenating the feature data of the current optical flow and feature data obtained from the first preprocessing neural network;
obtaining the current optical flow by applying the first concatenation result to a neural-network-based first decoder;
obtaining the current differential data by applying the feature data of the current differential data to a neural-network-based second decoder; and
reconstructing the current image using the current differential data and a current predicted image generated from a previous reconstructed image based on the current optical flow.

2. The image decoding method of claim 1, wherein the obtaining of the current differential data comprises:
applying at least one of the feature data of the current optical flow and the feature data of the previous optical flow to a second preprocessing neural network;
obtaining a second concatenation result by concatenating feature data obtained from the second preprocessing neural network with the feature data of the current differential data;
obtaining the current differential data by applying the second concatenation result to the neural-network-based second decoder.

3. The image decoding method of claim 1, wherein the obtaining of the current optical flow comprises:
applying feature data of previous differential data to a third preprocessing neural network;
obtaining a third concatenation result by concatenating the feature data of the current optical flow, the feature data obtained from the first preprocessing neural network, and feature data obtained from the third preprocessing neural network; and
obtaining the current optical flow by applying the third concatenation result to the neural-network-based first decoder.

4. The image decoding method of claim 1, wherein the obtaining of the current differential data comprises:
applying feature data of previous differential data to a fourth preprocessing neural network;
obtaining a fourth concatenation result by concatenating the feature data of the current differential data, and the feature data obtained from the fourth preprocessing neural network; and
obtaining the current differential data by applying the fourth concatenation result of to the neural-network-based second decoder.

5. The image decoding method of claim 1, wherein the reconstructing of the current image comprises generating the current predicted image by warping the previous reconstructed image based on the current optical flow.

6. The image decoding method of claim 1, wherein the feature data of the current optical flow and the feature data of the current differential data are obtained by performing entropy-decoding and inverse-quantization on the bitstream.

7. The image decoding method of claim 1, wherein at least one of the neural-network-based first decoder, the neural-network-based second decoder, and the first preprocessing neural network are trained based on first loss information corresponding to a difference between a current training image and a current reconstructed training image corresponding to the current training image, second loss information corresponding to entropy of feature data of an optical flow of the current training image, and third loss information corresponding to entropy of feature data of differential data of the current training image.

8. A non-transitory computer-readable recording medium having recorded thereon a program for executing the method of claim 1 on a computer.

9. An image decoding method using artificial intelligence (AI), the image decoding method comprising:
obtaining feature data of a current optical flow and feature data of current differential data from a bitstream corresponding to a current image;
performing at least one of a first neural network preprocessing operation, a second neural network preprocessing operation, a third neural network preprocessing operation, and a fourth neural network preprocessing operation;
obtaining a first concatenation result by concatenating the feature data of the current optical flow with at least one of a result of the second neural network preprocessing operation and a result of the third neural network preprocessing operation;
obtaining the current optical flow by applying the first concatenation result to a neural-network-based first decoder;
obtaining a second concatenation result by concatenating the feature data of the current differential data with at least one of a result of the first neural network preprocessing operation and a result of the fourth neural network preprocessing operation;
obtaining the current differential data by applying the second concatenation result to a neural-network-based second decoder; and
reconstructing the current image by warping a previous reconstructed image based on the current optical flow, and applying the current differential data to the warped previous reconstructed image,
wherein the first neural network preprocessing operation comprises applying at least one of the feature data of the current optical flow and feature data of a previous optical flow to a first preprocessing neural network,
wherein the second neural network preprocessing operation comprises applying the feature data of the previous optical flow to a second preprocessing neural network,
wherein the third neural network preprocessing operation comprises applying feature data of previous differential data to a third preprocessing neural network, and
wherein the fourth neural network preprocessing operation comprises applying the feature data of the previous differential data to a fourth preprocessing neural network.

* * * * *